(12) United States Patent
Yamaguchi et al.

(10) Patent No.: US 11,874,543 B2
(45) Date of Patent: Jan. 16, 2024

(54) LIQUID CRYSTAL DISPLAY DEVICE

(71) Applicant: Sharp Display Technology Corporation, Kameyama (JP)

(72) Inventors: Takahiro Yamaguchi, Kameyama (JP); Shige Furuta, Kameyama (JP); Yuhichiroh Murakami, Kameyama (JP); Hiroyuki Adachi, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/099,533

(22) Filed: Jan. 20, 2023

(65) Prior Publication Data

US 2023/0244097 A1 Aug. 3, 2023

(30) Foreign Application Priority Data

Feb. 1, 2022 (JP) .................. 2022-014005

(51) Int. Cl.
| | |
|---|---|
| *G02F 1/133* | (2006.01) |
| *G02F 1/1362* | (2006.01) |
| *G02F 1/1345* | (2006.01) |
| *G09G 3/36* | (2006.01) |
| *G02F 1/1343* | (2006.01) |

(52) U.S. Cl.
CPC ...... *G02F 1/13306* (2013.01); *G02F 1/13454* (2013.01); *G02F 1/13458* (2013.01); *G02F 1/134309* (2013.01); *G02F 1/136286* (2013.01); *G09G 3/36* (2013.01); *G09G 3/3614* (2013.01); *G02F 2201/40* (2013.01); *G09G 2310/0286* (2013.01); *G09G 2310/08* (2013.01)

(58) Field of Classification Search
CPC ........................................ G02F 1/133
See application file for complete search history.

(56) References Cited

U.S. PATENT DOCUMENTS

| | | | |
|---|---|---|---|
| 2008/0170168 A1* | 7/2008 | Jung | G02F 1/136209 349/47 |
| 2012/0154369 A1 | 6/2012 | Yamauchi | |
| 2017/0206853 A1* | 7/2017 | Koide | G09G 3/3696 |
| 2021/0287597 A1* | 9/2021 | Shin | G02F 1/13454 |
| 2022/0108663 A1* | 4/2022 | Numata | G09G 3/3614 |

FOREIGN PATENT DOCUMENTS

| | | |
|---|---|---|
| WO | 2011027600 A1 | 3/2011 |
| WO | 2020255536 A1 | 12/2022 |

\* cited by examiner

*Primary Examiner* — Sang V Nguyen
(74) *Attorney, Agent, or Firm* — ScienBiziP, P.C.

(57) ABSTRACT

A plurality of pixel electrodes are provided in a display region. A plurality of pixel transistors corresponding to the plurality of pixel electrodes in a one-to-one manner are provided in a region outside the display region. Each of the pixel transistors is connected to the corresponding pixel electrode by a pixel wiring line. An input pad group, to which a drive signal group for driving the plurality of pixel transistors is input, is provided on a TFT substrate. Here, of a region on the TFT substrate, the plurality of pixel transistors are provided only in a region other than a region between the input pad group and the display region.

15 Claims, 43 Drawing Sheets

LIQUID CRYSTAL DISPLAY DEVICE

CROSS-REFERENCE TO RELATED APPLICATIONS

This application claims the benefit of priority to Japanese Patent Application Number 2022-014005 filed on Feb. 1, 2022. The entire contents of the above-identified application are hereby incorporated by reference.

BACKGROUND

Technical Field

The following disclosure relates to a liquid crystal display device, and particularly relates to a liquid crystal display device in which pixels in a display region are driven individually.

Liquid crystal display devices can be roughly classified into transmissive liquid crystal display devices that utilize light emitted from a backlight provided on the back face of a display portion, and reflective liquid crystal display devices that utilize reflected external light. Note that semi-transmissive liquid crystal display devices are also known that utilize both light emitted from the backlight and reflected external light. Since the reflective liquid crystal display device does not require a backlight, a reduction in power consumption and a reduction in device thickness can be more easily realized with the reflective liquid crystal display device than with the transmissive liquid crystal display device. Further, in recent years, a dual-layer structure display device (hereinafter also referred to as a "dual-layer display") has also been developed that is obtained by providing an organic EL display device on the back face of a reflective liquid crystal display device such as that described above. The dual-layer display is typically adopted in a wristwatch, and in the dual-layer display, for example, when high-definition display is performed, image display is performed by the organic EL display device, and when simple display such as display of character information is performed, image display is performed by the reflective liquid crystal display device.

Incidentally, since the reflective liquid crystal display device utilizes reflected external light, if the aperture ratio of the display region is low, a sufficient display quality cannot be obtained. Therefore, it is preferable to increase the aperture ratio as much as possible. Thus, WO 2011/027600 discloses a configuration of a pixel circuit with which an effect of reducing power consumption can be obtained without lowering the aperture ratio.

Further, in recent years, in order to reduce power consumption, a liquid crystal display device provided with a memory circuit inside a pixel circuit has been developed. In this regard, WO 2020/255536 discloses a liquid crystal display device that makes it possible to stop operation of an image signal control circuit during a memory mode (a drive mode in which a signal recorded in a memory circuit is used) by providing a mechanism in which a signal that controls a polarity signal is output using a system control circuit. According to this liquid crystal display device, since operation of the image signal control circuit can be stopped during the memory mode, a significant reduction in power consumption is realized.

SUMMARY

However, according to the configuration disclosed in WO 2011/027600, since a pixel transistor, the memory circuit, and the like are present in the display region, a sufficient aperture ratio cannot be obtained. In this regard, although it is conceivable to provide some of the constituent elements provided in the display region outside the display region, there is a concern that a frame region will become wider. In recent years, there has been a strong demand for downsizing a wearable device such as a wristwatch, in particular, so an increase in the size of the frame region is not preferable.

Further, according to the configuration disclosed in WO 2020/255536, since a drive circuit (an image signal output unit) is provided between an input pad group and a display region (see FIGS. 1 and 2 of WO 2020/255536), a frame region on the side of the input pad group with respect to the display region as a reference inevitably becomes wider.

Thus, an object of the following disclosure is to realize a liquid crystal display device capable of obtaining a sufficient aperture ratio while suppressing an increase in the size of a frame region.

(1) A liquid crystal display device according to some embodiments of the disclosure includes a panel substrate provided with a display region including a plurality of pixel electrodes. The liquid crystal display device includes a plurality of pixel transistors that are provided in a region outside the display region and correspond to the plurality of pixel electrodes in a one-to-one manner, a plurality of pixel wiring lines configured to respectively connect the plurality of pixel electrodes to the plurality of pixel transistors, and an input pad group provided on the panel substrate and to which a drive signal group for driving the plurality of pixel transistors is input. Of a region on the panel substrate, the plurality of pixel transistors are provided only in a region other than a region between the input pad group and the display region.

(2) Further, a liquid crystal display device according to some embodiments of the disclosure includes the configuration of (1) described above, and in the liquid crystal display device, the panel substrate has a rectangular shape formed by a first side, a second side facing the first side, a third side connecting one end of the first side and one end of the second side, and a fourth side connecting an other end of the first side and an other end of the second side, the input pad group is provided in a frame region along the first side on the panel substrate, and the plurality of pixel transistors are not provided in the frame region along the first side and are provided in one of a frame region along the second side, a frame region along the third side, and a frame region along the fourth side.

(3) Further, a liquid crystal display device according to some embodiments of the disclosure includes the configuration of (2) described above, and in the liquid crystal display device, the plurality of pixel transistors are disposed having a direction extending from the plurality of pixel transistors to the plurality of pixel electrodes being the same for all of the plurality of pixel wiring lines.

(4) Further, a liquid crystal display device according to some embodiments of the disclosure includes the configuration of (3) described above, and in the liquid crystal display device, the plurality of pixel transistors are provided only in the frame region along the second side.

(5) Further, a liquid crystal display device according to some embodiments of the disclosure includes the configuration of (3) described above, and in the liquid crystal display device, the plurality of pixel transistors are provided only in one of the frame region along the third side and the frame region along the fourth side.

(6) Further, a liquid crystal display device according to some embodiments of the disclosure includes the configuration of (2) described above, and in the liquid crystal display device, the plurality of pixel transistors are provided in the frame region along the third side and the frame region along the fourth side, and the plurality of pixel wiring lines include a plurality of first-type pixel wiring lines configured to connect the pixel transistors provided in the frame region along the third side to the corresponding pixel electrodes, and a plurality of second-type pixel wiring lines configured to connect the pixel transistors provided in the frame region along the fourth side to the corresponding pixel electrodes.

(7) Further, a liquid crystal display device according to some embodiments of the disclosure includes the configuration of (1) described above, and in the liquid crystal display device, the panel substrate has a circular shape, and the plurality of pixel transistors are provided only in the frame region on a side on which the display region is present with respect to a second virtual line as a reference, the first virtual line being a shortest virtual line connecting the display region and the input pad group, and the second virtual line being a virtual line orthogonal to the first virtual line and passing through a connection point between the first virtual line and the display region.

(8) Further, a liquid crystal display device according to some embodiments of the disclosure includes the configuration of (7) described above, and in the liquid crystal display device, the plurality of pixel transistors are disposed having a direction extending from the plurality of pixel transistors to the plurality of pixel electrodes being the same for all of the plurality of pixel wiring lines.

(9) Further, a liquid crystal display device according to some embodiments of the disclosure includes the configuration of (8) described above, and in the liquid crystal display device, the plurality of pixel transistors are provided only in the frame region on a side on which the input pad group is not present with respect to a third virtual line as a reference, the third virtual line being a virtual line passing through a center of the display region and being parallel to the second virtual line.

(10) Further, a liquid crystal display device according to some embodiments of the disclosure includes the configuration of (8) described above, and in the liquid crystal display device, the plurality of pixel transistors are provided only in the frame region on one side with respect to a fourth virtual line as a reference, the fourth virtual line being a virtual line passing through the connection point between the first virtual line and the display region and through a center of the display region.

(11) Further, a liquid crystal display device according to some embodiments of the disclosure includes the configuration of (7) described above, and in the liquid crystal display device, the plurality of pixel transistors are provided in both the frame region on one side and the frame region on an other side with respect to a fourth virtual line as a reference, the fourth virtual line being a virtual line passing through the connection point between the first virtual line and the display region and through a center of the display region, and the plurality of pixel wiring lines include a plurality of first-type pixel wiring lines configured to connect the pixel transistors provided in the frame region on the one side, with respect to the fourth virtual line, to the corresponding pixel electrodes, and a plurality of second-type pixel wiring lines configured to connect the pixel transistors provided in the frame region on the other side, with respect to the fourth virtual line, to the corresponding pixel electrodes.

(12) Further, a liquid crystal display device according to some embodiments of the disclosure includes the configuration of (6) or (11) described above, and in the liquid crystal display device, a number of the plurality of first-type pixel wiring lines and a number of the plurality of second-type pixel wiring lines are the same.

(13) Further, a liquid crystal display device according to some embodiments of the disclosure includes a drive circuit configured to drive the plurality of pixel transistors based on the drive signal group, in addition to the configuration of any one of (1) to (12) described above, and in the liquid crystal display device, of the region on the panel substrate, the drive circuit is provided in a region other than the region between the input pad group and the display region such that the plurality of pixel transistors are disposed in a region between the drive circuit and the display region.

(14) Further, a liquid crystal display device according to some embodiments of the disclosure includes the configuration of (13) described above, and in the liquid crystal display device, the drive circuit includes a shift register constituted by a plurality of unit circuits connected in series, the plurality of unit circuits output, as a plurality of timing signals, a plurality of output signals that become active sequentially, and capturing of a plurality of data signals included in the drive signal group is performed based on the plurality of timing signals.

(15) Further, a liquid crystal display device according to some embodiments of the disclosure includes the configuration of (13) described above, and in the liquid crystal display device, the drive circuit includes a decoding circuit including a plurality of output units, the plurality of output units output, as a plurality of timing signals, a plurality of decoding signals that become active sequentially, and capturing of a plurality of data signals included in the drive signal group is performed based on the plurality of timing signals.

(16) Further, a liquid crystal display device according to some embodiments of the disclosure includes the configuration of (14) or (15) described above, and in the liquid crystal display device, the drive circuit includes M latch circuits for one timing signal, M being an integer of 2 or more, and the M latch circuits capture M data signals of the plurality of data signals based on the corresponding timing signals, and output the M data signals captured.

(17) Further, a liquid crystal display device according to some embodiments of the disclosure includes a polarity switching circuit that includes the plurality of pixel transistors and is configured to switch a polarity of a voltage applied to the plurality of pixel electrodes at a predetermined interval, in addition to the configuration of (16) described above, and in the liquid crystal display device, the polarity switching circuit is constituted by a plurality of polarity controllers respectively corresponding to the plurality of pixel wiring lines, and each of the plurality of polarity controllers includes a first pixel transistor and a second pixel transistor for which an on/off state changes in a mutually inverted manner based on the data signal output from the corresponding latch circuit. A first voltage and a second voltage, of which voltage level changes in a mutually inverted manner between a first level and a second level at the predetermined interval, are applied to each of the plurality of polarity controllers. When the first pixel transistor is in the on state, the first voltage is applied to the corresponding pixel electrode via the corresponding pixel wiring line, and when the second pixel transistor is in the on state, the second voltage is applied to the corresponding pixel electrode via the corresponding pixel wiring line.

(18) Further, a liquid crystal display device according to some embodiments of the disclosure includes a sampling circuit including the plurality of pixel transistors, in addition to the configuration of (14) or (15) described above, and in the liquid crystal display device, the plurality of pixel transistors are grouped with one group being formed by K pixel transistors of the plurality of pixel transistors, K being an integer of 2 or more, and each of the plurality of pixel transistors includes a control terminal to which the corresponding timing signal is provided, a first conduction terminal to which the corresponding data signal is provided, and a second conduction terminal connected to the corresponding pixel wiring line. The same timing signal is provided to the control terminals of the K pixel transistors forming the same group, and mutually different data signals are provided to the first conduction terminals of the K pixel transistors forming the same group.

(19) Further, a liquid crystal display device according to some embodiments of the disclosure includes the configuration of any one of (1) to (12) described above, and in the liquid crystal display device, each of the plurality of pixel transistors includes a control terminal to which a switch control signal included in the drive signal group is provided, a first conduction terminal to which a data signal included in the drive signal group is provided, and a second conduction terminal connected to the corresponding pixel wiring line. The same switch control signal is provided to the control terminals of the plurality of pixel transistors, and mutually different data signals are provided to the first conduction terminals of the plurality of pixel transistors.

(20) Further, a liquid crystal display device according to some embodiments of the disclosure includes the configuration of any one of (1) to (12) described above, and in the liquid crystal display device, the plurality of pixel transistors are grouped with one group being formed by Z pixel transistors of the plurality of pixel transistors, Z being an integer of 2 or more, and each of the plurality of pixel transistors includes a control terminal to which a switch control signal included in the drive signal group is provided, a first conduction terminal to which a data signal included in the drive signal group is provided, and a second conduction terminal connected to the corresponding pixel wiring line. Mutually different switch control signals are provided to the control terminals of the Z pixel transistors forming the same group, and one data signal is provided to the first conduction terminals of the Z pixel transistors forming the same group in a time division manner.

According to a liquid crystal display device according to some embodiments of the disclosure, pixel transistors are provided in a region outside a display region. In other words, the pixel transistors are not provided in the display region. As a result, a sufficient aperture ratio can be obtained in the display region. Further, of a region on a panel substrate, the pixel transistors are provided only in a region other than a region between an input pad group and the display region. As a result, compared to a configuration in which the pixel transistors are provided in the region between the input pad group and the display region, the size of a frame region can be reduced as a whole. In the configuration described above, a liquid crystal display device capable of obtaining a sufficient aperture ratio while suppressing an increase in the size of the frame region is realized.

BRIEF DESCRIPTION OF DRAWINGS

The disclosure will be described with reference to the accompanying drawings, wherein like numbers reference like elements.

DESCRIPTION OF EMBODIMENTS

0. Matters Related to All Embodiments

First, matters related to all embodiments will be described.

0.1 Schematic Configuration of Display Device

Figure 2:
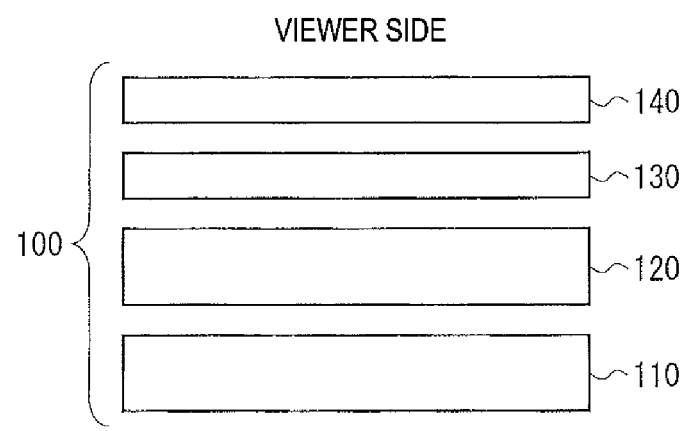
FIG. 2 is a diagram for describing a schematic configuration of a display device (a dual-layer display), with respect to all the embodiments.

FIG. 2 is a diagram for describing a schematic configuration of a display device 100 in all the embodiments. Note that this display device 100 is a dual-layer display including two display panels. As illustrated in FIG. 2, this display device 100 is constituted by a polarizer 140, a phase difference plate 130, a liquid crystal display device 120, and an organic EL display device 110. As illustrated in FIG. 2, those constituent elements are arranged in the order of the polarizer 140, the phase difference plate 130, the liquid crystal display device 120, and the organic EL display device 110 from the side of a viewer. The polarizer 140 may be of an absorption type, or may be of a reflective type. The liquid crystal display device 120 is a reflective liquid crystal display device, and the cell thickness of the liquid crystal display device 120 is approximately half the cell thickness of a typical transmissive liquid crystal display device. The organic EL display device 110 includes a reflective layer.

Note that the phase difference plate 130 is provided for optical compensation or expansion of the viewing angle, but a configuration in which the phase difference plate 130 is not provided can also be employed.

In the configuration described above, when high-definition display is performed, image display is performed by the organic EL display device 110 with all pixels of the liquid crystal display device 120 in a transmissive state. On the other hand, when simple display such as display of character information is performed, image display is performed by the liquid crystal display device 120 utilizing reflected external light reflected by the reflective layer of the organic EL display device 110.

Note that, as described above, the object of the disclosure is to realize a liquid crystal display device in which a sufficient aperture ratio is obtained while suppressing an increase in the size of a frame region. Thus, in the following description, only the liquid crystal display device 120 will be described.

0.2 Configuration on TFT Substrate

The liquid crystal display device 120 is constituted by two substrates (a TFT substrate and a counter substrate) facing each other. On the TFT substrate, pixel electrodes, pixel wiring lines, pixel transistors, and the like are formed. On the counter substrate, a common electrode that is shared by all the pixels is formed. A configuration on the TFT substrate will be described in detail below.

With respect to the configuration on the TFT substrate (an arrangement of each of constituent elements), before describing a configuration that can be employed in each of the embodiments, a configuration as a reference example (see FIG. 43) will be described. In the configuration according to the reference example, a display region 910 on a TFT substrate 95 is divided into a plurality of unit display regions 919. Pixel electrodes are formed in the display region 910 so as to correspond to each of the unit display regions 919, and a pixel transistor 930 corresponding to each of the pixel electrodes is provided outside the display region 910. More specifically, on the TFT substrate 95, a plurality of the pixel transistors 930 are provided along one side of the four sides forming the display region 910. Further, a pixel wiring line 911 that connects the pixel transistor 930 to a corresponding pixel electrode is formed on the TFT substrate 95. With the configuration described above, pixels in the display region 910 are driven individually. Here, a drive circuit 940 that drives the plurality of pixel transistors 930 is formed in the vicinity of the plurality of pixel transistors 930. Further, in the vicinity of the drive circuit 940, an input pad group 920, to which a drive signal group for driving the plurality of pixel transistors 930 is input, is provided. Furthermore, on the TFT substrate 95, a signal wiring line group 951 is formed that is configured to transmit, to the drive circuit 940, the drive signal group that has been input to the input pad group 920.

Figure 43:
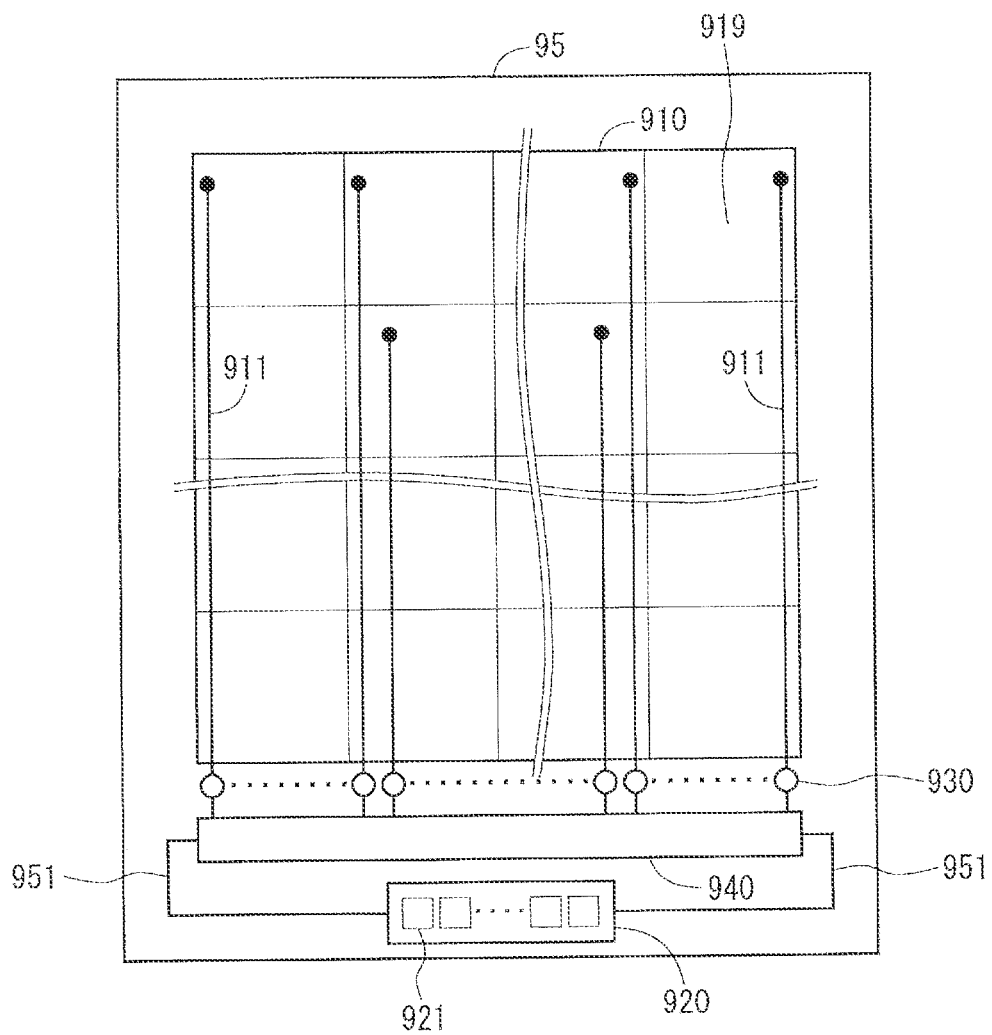
FIG. 43 is a diagram for describing a case where a drive circuit and pixel transistors are disposed in the vicinity of an input pad group.

Note that, in FIG. 43, one of input pads is denoted by a reference sign 921.

As described above, according to the configuration of the reference example, the drive circuit 940 and the pixel transistors 930 are provided between the input pad group 920 and the display region 910. Therefore, similarly to the configuration disclosed in WO 2020/255536, the frame region on the input pad group 920 side with respect to the display region 910 inevitably becomes wider. Thus, in the following description, configurations (arrangements of each of the constituent elements on the TFT substrate 95) that can be employed in the embodiments described below will be described.

0.2.1 First Example

Figure 1:
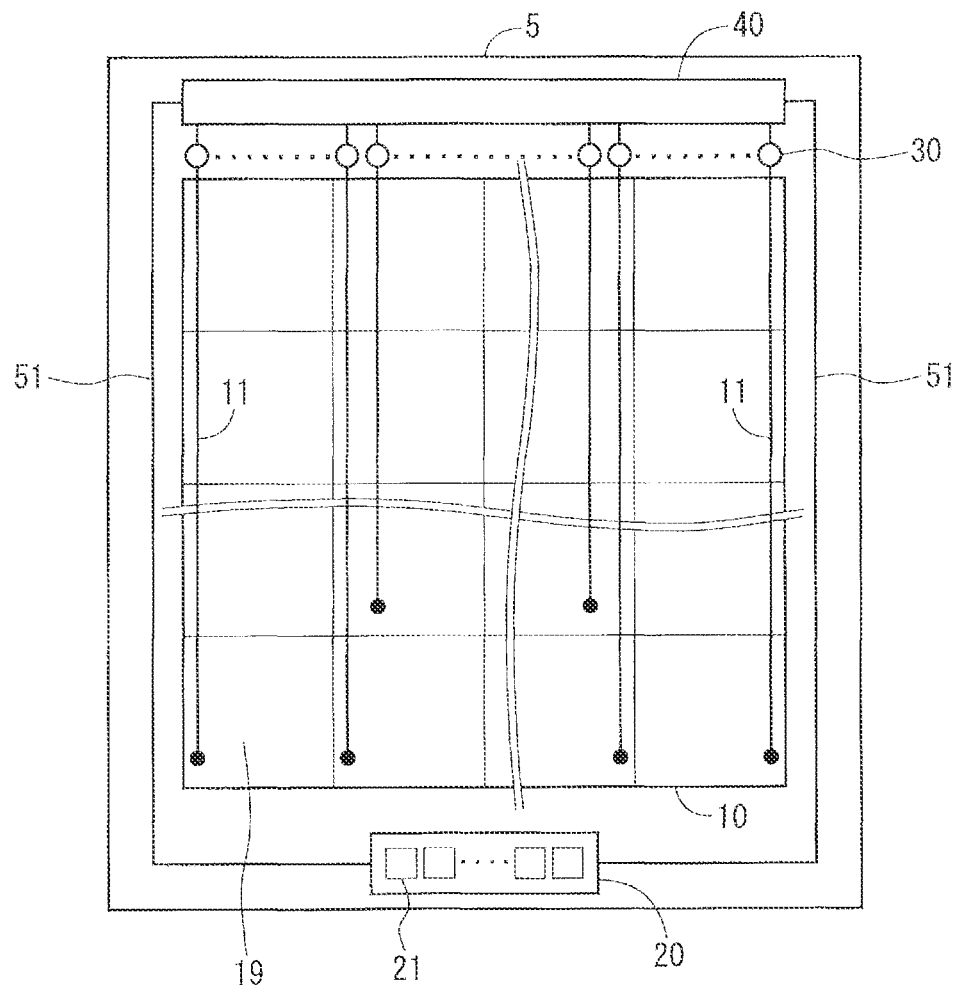
FIG. 1 is a diagram illustrating a first example of an arrangement of each of constituent elements on a TFT substrate, with respect to all embodiments.

FIG. 1 is a diagram illustrating a first example regarding an arrangement of each of constituent elements on a TFT substrate 5. As illustrated in FIG. 1, the TFT substrate 5 has a rectangular shape. In the first example, as in the reference example, a display region 10 on the TFT substrate 5 is divided into a plurality of unit display regions 19, and pixel electrodes are formed in the display region 10 so as to correspond to each of the unit display regions 19 (the same configuration is employed in second to seventh examples described below). Further, as in the reference example, pixel wiring lines 11 that connect the pixel electrodes to pixel transistors 30 are formed on the TFT substrate 5. With such a configuration, pixels in the display region 10 are driven individually.

In the first example, unlike the reference example, the pixel transistors 30 and a drive circuit 40 are provided in a frame region on a side opposite to a frame region in which an input pad group 20 is provided, the display region 10 being interposed therebetween. Hereinafter, with regard to the TFT substrate 5, for convenience of explanation, a side located on the lower side in the drawings (FIG. 1 and the like) will be referred to as a "first side", a side located on the upper side in the drawings (a side facing the first side) will be referred to as a "second side", a side located on the left side in the drawings (a side connecting one end of the first side and one end of the second side) will be referred to as a "third side", and a side located on the right side in the drawings (a side connecting the other end of the first side and the other end of the second side) will be referred to as a "fourth side". Given the definitions above, in the first example, the input pad group 20 is provided in a frame region along the first side, and the pixel transistors 30 and the drive circuit 40 are provided only in a frame region along the second side. Turning attention to the frame region along the second side, the pixel transistors 30 are disposed in a region between the drive circuit 40 and the display region 10.

Note that, in FIG. 1, a reference sign 51 is assigned to a signal wiring line group for transmitting, to the drive circuit 40, a drive signal group that has been input to the input pad group 20, and a reference sign 21 is assigned to one of input pads included in the input pad group 20 (the same applies to FIGS. 3 to 9).

Incidentally, in the first example, the plurality of pixel transistors 30 and the plurality of pixel wiring lines 11 are disposed so as to perform driving called "single-sided driving". In other words, the plurality of pixel transistors 30 are disposed so that a direction extending from the pixel transistor 30 to the pixel electrode is the same for all of the plurality of pixel wiring lines 11.

0.2.2 Second Example

Figure 3:
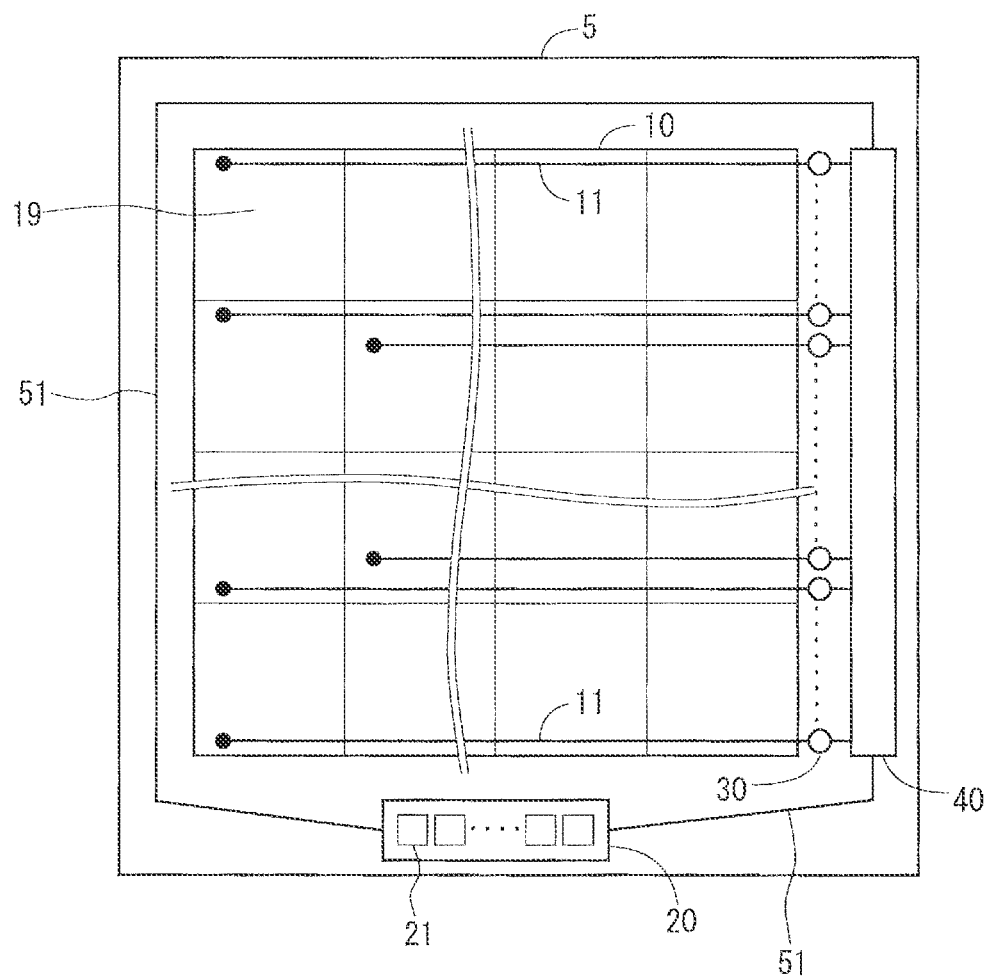
FIG. 3 is a diagram illustrating a second example of the arrangement of each of the constituent elements on the TFT substrate, with respect to all the embodiments.

FIG. 3 is a diagram illustrating a second example regarding the arrangement of each of constituent elements on the TFT substrate 5. As illustrated in FIG. 3, the TFT substrate 5 has a rectangular shape. In the second example, the input pad group 20 is provided in the frame region along the first side, and the pixel transistors 30 and the drive circuit 40 are provided only in a frame region along the fourth side. Turning an attention to the frame region along the fourth side, the pixel transistors 30 are disposed in the region between the drive circuit 40 and the display region 10. Note that the pixel transistors 30 and the drive circuit 40 may be provided only in a frame region along the third side. As in the first example, the plurality of pixel transistors 30 and the plurality of pixel wiring lines 11 are disposed so as to perform the driving called the "single-sided driving".

0.2.3 Third Example

Figure 4:
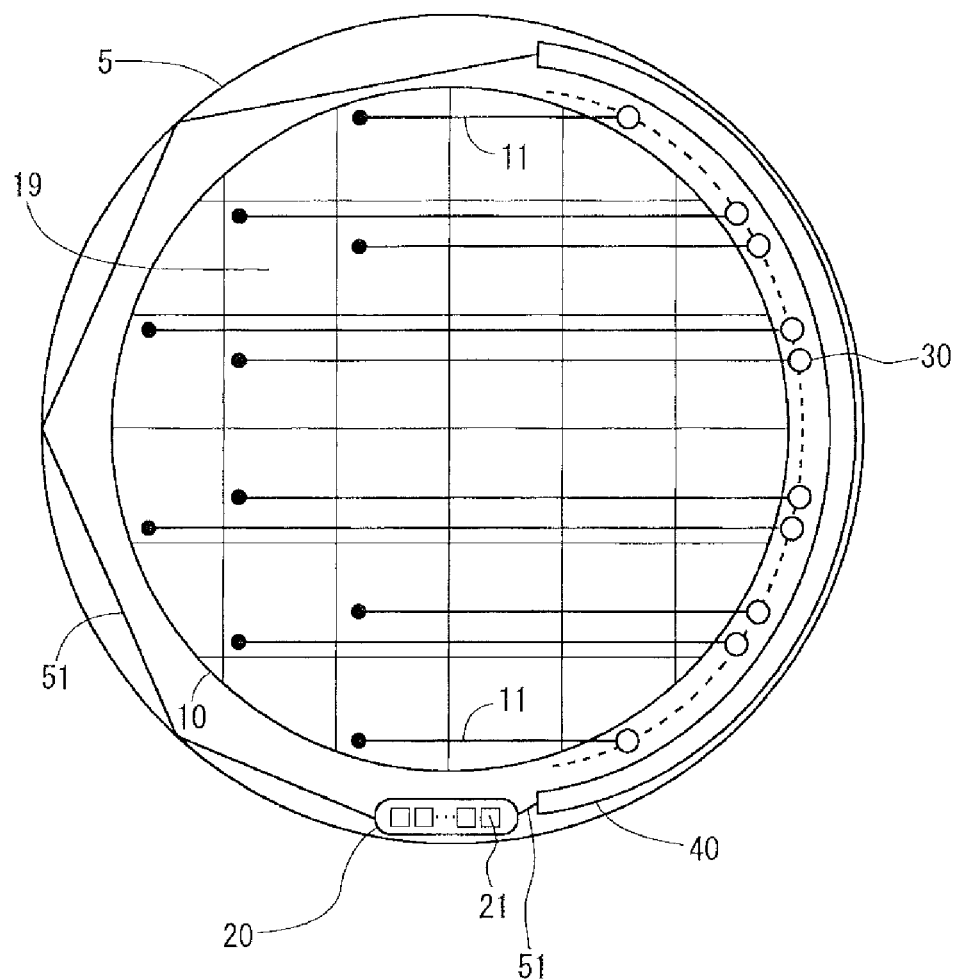
FIG. 4 is a diagram illustrating a third example of the arrangement of each of the constituent elements on the TFT substrate, with respect to all the embodiments.

FIG. 4 is a diagram illustrating a third example regarding the arrangement of each of the constituent elements on the TFT substrate 5. As illustrated in FIG. 4, unlike the first example and the second example, the TFT substrate 5 has a circular shape. In the third example, the input pad group 20 is provided on the lower side of the display region 10 in FIG. 4, and the pixel transistors 30 and the drive circuit 40 are provided on the right side of the display region 10 in FIG. 4. Turning an attention to the right side of the display region 10 in FIG. 4, the pixel transistors 30 are disposed in a region between the drive circuit 40 and the display region 10. As in the first example and the second example, the plurality of pixel transistors 30 and the plurality of pixel wiring lines 11 are disposed so as to perform the driving called the "single-sided driving". Note that the pixel transistors 30 and the drive circuit 40 may be provided on the left side of the display region 10 in FIG. 4.

Figure 5:
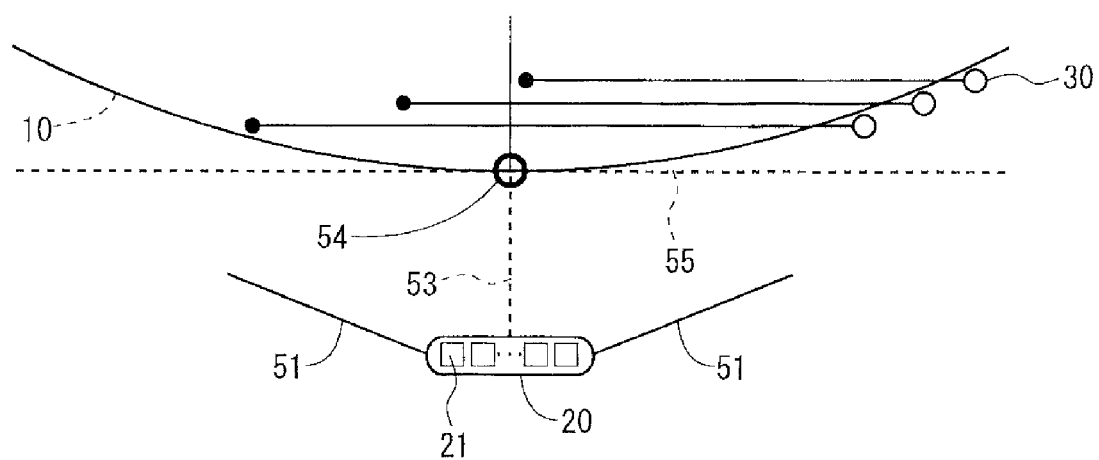
FIG. 5 is a diagram for describing the third example in detail with respect to all the embodiments.

With reference to FIG. 5, a positional relationship between the input pad group 20 and the pixel transistors 30 will be described in further detail. Here, the shortest virtual line connecting the display region 10 and the input pad group 20 is referred to as a "first virtual line". The first virtual line is denoted by a reference sign 53. A connection point between the first virtual line 53 and the display region 10 is denoted by a reference sign 54. Further, a virtual line orthogonal to the first virtual line 53 and passing through the connection point 54 between the first virtual line 53 and the display region 10 (a tangential line passing through the connection point 54) is referred to as a "second virtual line". The second virtual line is denoted by a reference sign 55. Based on the assumption described above, the pixel transistors 30 are provided only in the frame region on the side on which the display region 10 is present with respect to the second virtual line 55 as a reference.

0.2.4 Fourth Example

Figure 6:
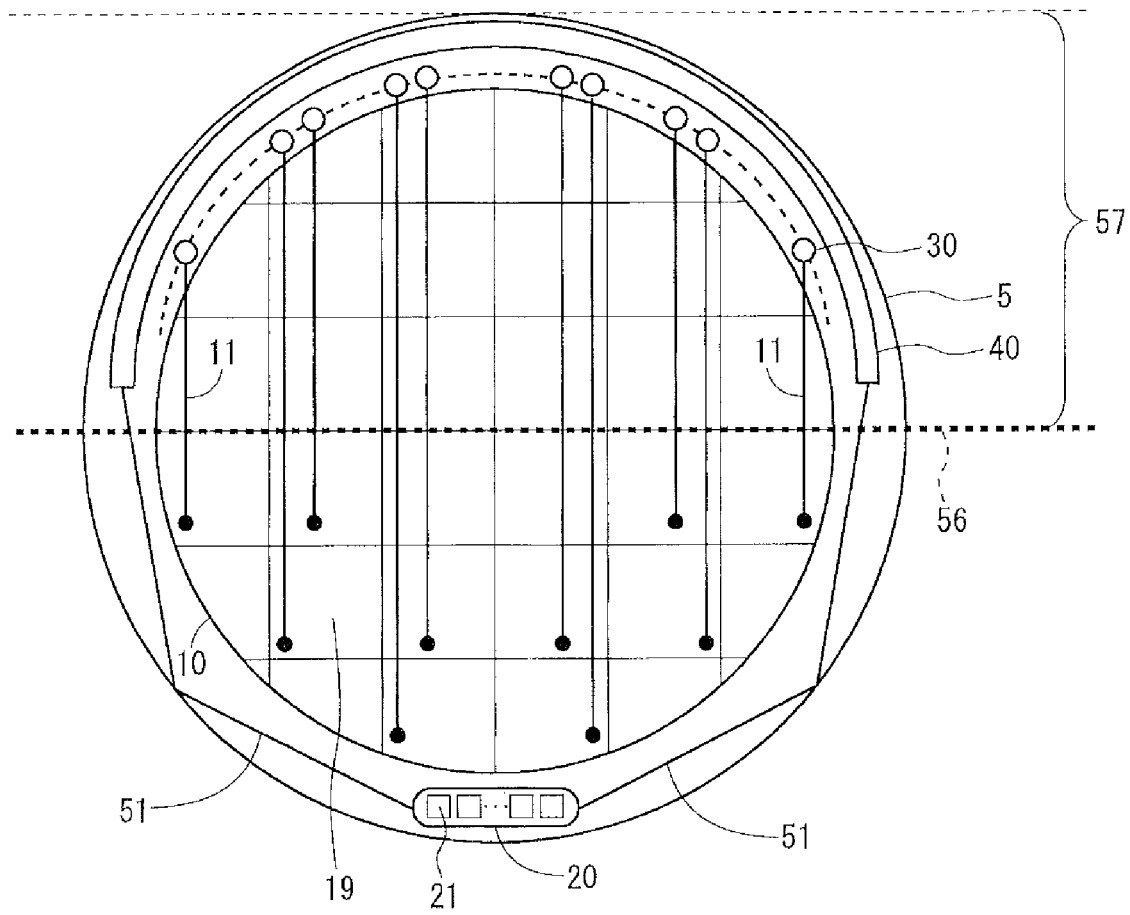
FIG. 6 is a diagram illustrating a fourth example of the arrangement of each of the constituent elements on the TFT substrate, with respect to all the embodiments.

FIG. 6 is a diagram illustrating a fourth example regarding the arrangement of each of the constituent elements on the TFT substrate 5. As illustrated in FIG. 6, the TFT substrate 5 has a circular shape. In the fourth example, the input pad group 20 is provided on the lower side of the display region 10 in FIG. 6, and the pixel transistors 30 and the drive circuit 40 are provided on the upper side of the display region 10 in FIG. 6. Specifically, when a virtual line passing through the center of the display region 10 and parallel to the second virtual line 55 is referred to as a "third virtual line" (the third virtual line is denoted by a reference sign 56), the pixel transistors 30 are provided only in the frame region on the side on which the input pad group 20 is not present with respect to the third virtual line 56 as a reference (the frame region within a range denoted by a reference sign 57 in FIG. 6). Note that in this fourth example also, the pixel transistors 30 are disposed in the region between the drive circuit 40 and the display region 10. Further, the plurality of pixel transistors 30 and the plurality of pixel wiring lines 11 are disposed so as to perform the driving called the "single-sided driving".

0.2.5 Fifth Example

Figure 7:
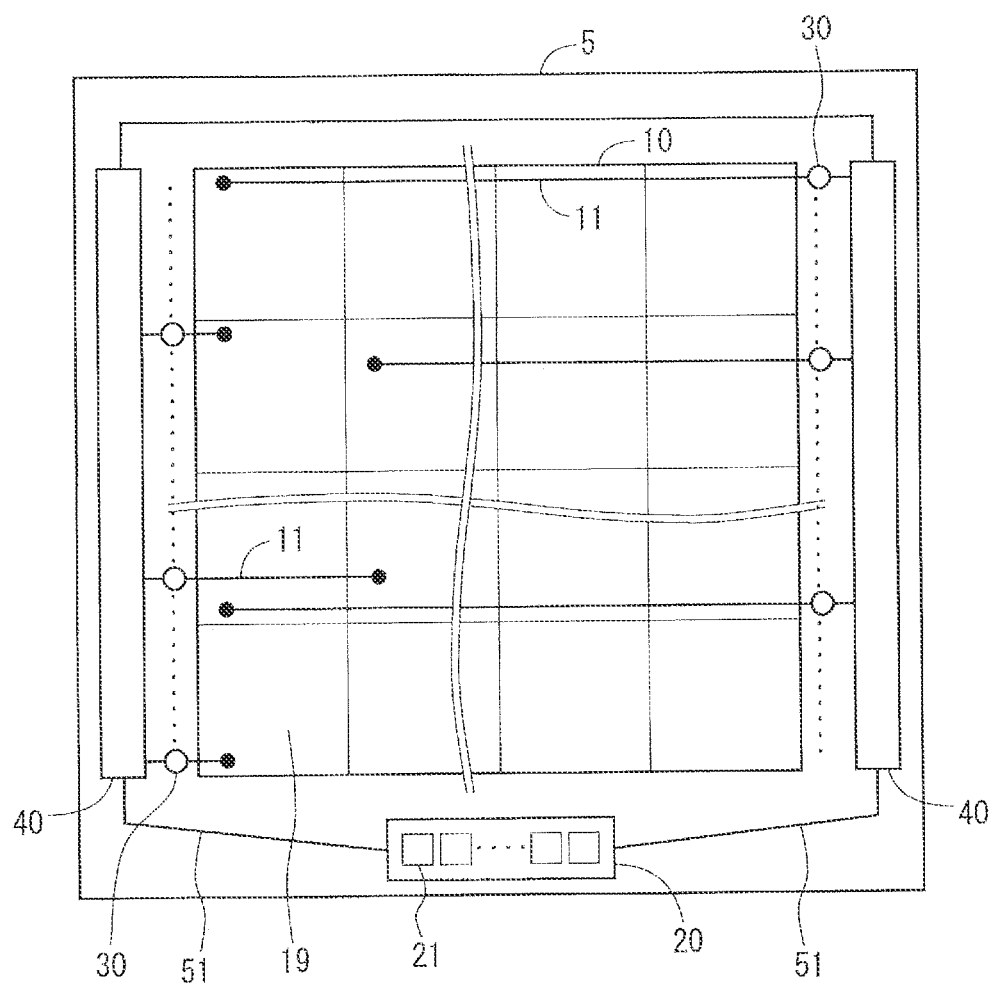
FIG. 7 is a diagram illustrating a fifth example of the arrangement of each of the constituent elements on the TFT substrate, with respect to all the embodiments.

FIG. 7 is a diagram illustrating a fifth example regarding the arrangement of each of the constituent elements on the TFT substrate 5. As illustrated in FIG. 7, the TFT substrate 5 has a rectangular shape. In the fifth example, unlike the first to fourth examples, the plurality of pixel transistors 30 and the plurality of pixel wiring lines 11 are disposed so as to perform driving called "double-sided driving". The input pad group 20 is provided in the frame region along the first side, and the pixel transistors 30 and the drive circuit 40 are provided in the frame region along the third side and the frame region along the fourth side. For example, of all of the pixel transistors 30, half the pixel transistors 30 are provided in the frame region along the third side, and the remaining pixel transistors 30 are provided in the frame region along the fourth side. Since the pixel transistors 30 are provided in the frame region along the third side and the frame region along the fourth side in this manner, there are the pixel wiring lines 11 extending from the pixel electrodes to the frame region along the third side, and the pixel wiring lines 11 extending from the pixel electrodes to the frame region along the fourth side. These pixel wiring lines 11 are formed, for example, in a comb shape.

In the fifth example, in order to realize the driving called the "double-sided driving", the plurality of pixel wiring lines 11 respectively connected to the plurality of pixel electrodes in the display region 10 include a plurality of first-type pixel wiring lines that connect the pixel transistors 30 provided in the frame region along the third side to the corresponding pixel electrodes, and a plurality of second-type pixel wiring lines that connect the pixel transistors 30 provided in the frame region along the fourth side to the corresponding pixel electrodes. The pixel transistors 30 connected to the plurality of first-type pixel wiring lines are provided only in the frame region along the third side, and the pixel transistors 30 connected to the plurality of second-type pixel wiring lines are provided only in the frame region along the fourth side.

0.2.6 Sixth Example

Figure 8:
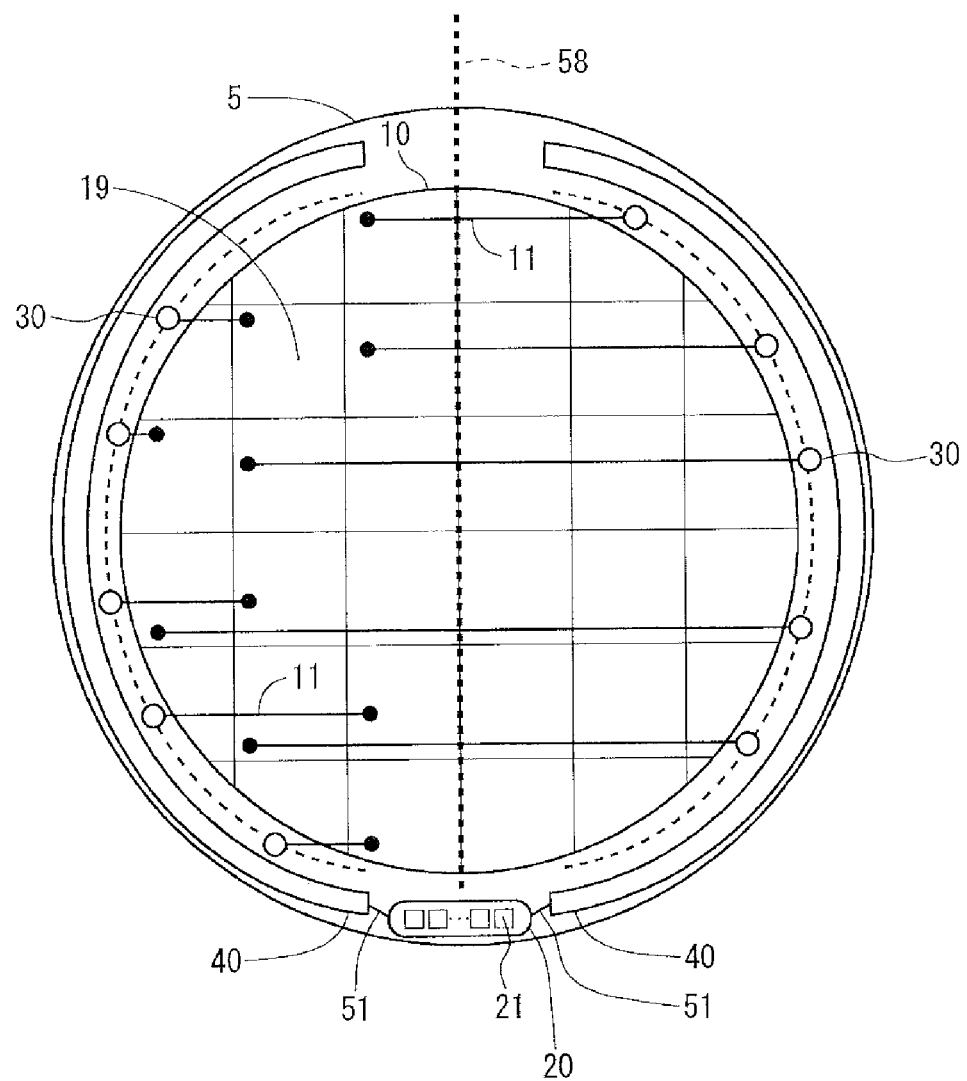
FIG. 8 is a diagram illustrating a sixth example of the arrangement of each of the constituent elements on the TFT substrate, with respect to all the embodiments.

FIG. 8 is a diagram illustrating a sixth example regarding the arrangement of each of the constituent elements on the TFT substrate 5. As illustrated in FIG. 8, the TFT substrate 5 has a circular shape. In the sixth example, as in the fifth example, the plurality of pixel transistors 30 and the plurality of pixel wiring lines 11 are disposed so as to perform the driving called the "double-sided driving". The input pad group 20 is provided on the lower side of the display region 10 in FIG. 8, and the pixel transistors 30 and the drive circuit 40 are provided on both the left side of the display region 10 and the right side of the display region 10 in FIG. 8. For example, of all of the pixel transistors 30, half the pixel transistors 30 are provided in the frame region on the left side of the display region 10, and the remaining pixel transistors 30 are provided in the frame region on the right side of the display region 10. Since the pixel transistors 30 are provided in the frame region on the left side of the display region 10 and the frame region on the right side of the display region 10 in this manner, there are the pixel wiring lines 11 extending from the pixel electrodes to the frame region on the left side of the display region 10, and the pixel wiring lines 11 extending from the pixel electrodes to the frame region on the right side of the display region 10. These pixel wiring lines 11 are formed, for example, in a comb shape.

Note that, as in the third example, the pixel transistors 30 are provided only in the frame region on the side on which the display region 10 is present with respect to the above-described second virtual line 55 as a reference. Here, when a virtual line passing through the above-described connection point 54 between the first virtual line 53 and the display region 10 (see FIG. 5) and the center of the display region 10 is referred to as a "fourth virtual line" (the fourth virtual line is denoted by a reference sign 58), in the third example, the pixel transistors 30 are provided only in a region on one side of the fourth virtual line 58 (see FIG. 4). In contrast, in this sixth example, the pixel transistors 30 are provided in both the frame region on the one side and the frame region on the other side with respect to the fourth virtual line 58 as a reference.

In the sixth example, in order to realize the driving called the "double-sided driving", the plurality of pixel wiring lines 11 respectively connected to the plurality of pixel electrodes in the display region 10 include a plurality of first-type pixel wiring lines that connect the pixel transistors 30 provided in the frame region on the one side of the fourth virtual line 58 to the corresponding pixel electrodes, and a plurality of second-type pixel wiring lines that connect the pixel transistors 30 provided in the frame region on the other side of the fourth virtual line 58 to the corresponding pixel electrodes. The pixel transistors 30 connected to the plurality of first-type pixel wiring lines are provided only in the frame region on the one side of the fourth virtual line 58, and the pixel transistors 30 connected to the plurality of second-type pixel wiring lines are provided only in the frame region on the other side of the fourth virtual line 58.

0.2.7 Seventh Example

Figure 9:
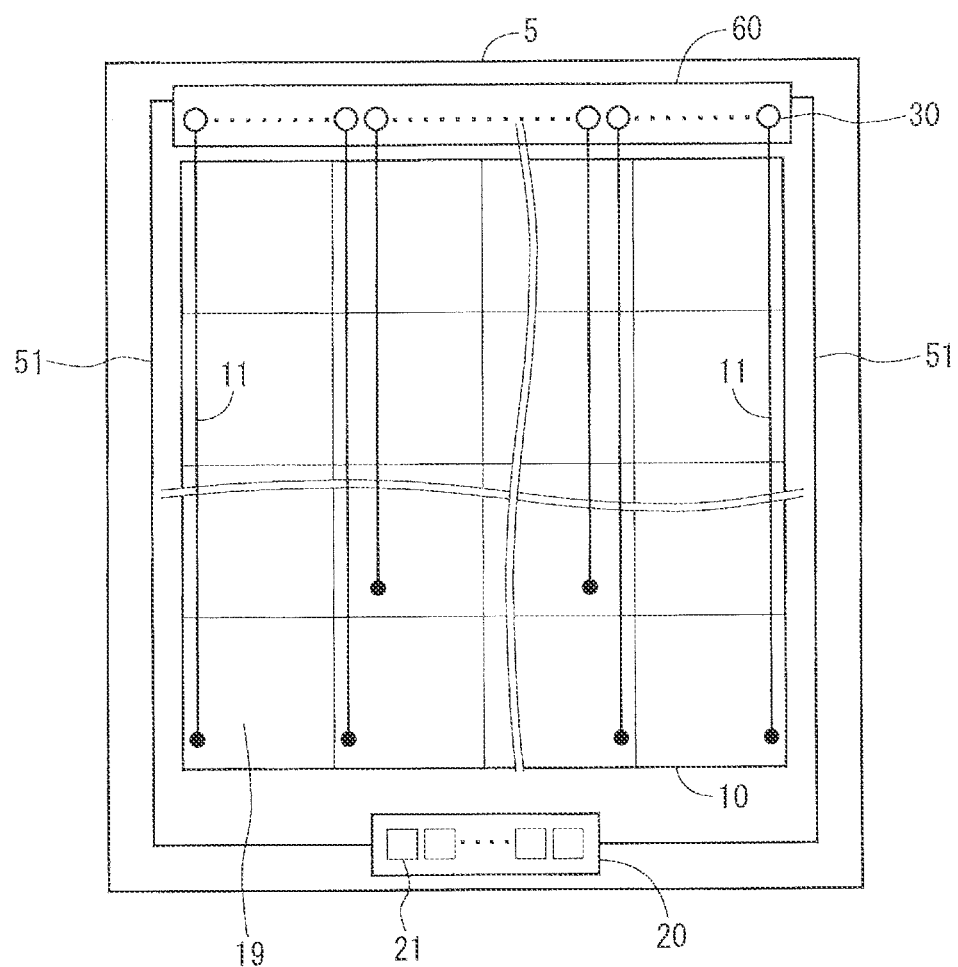
FIG. 9 is a diagram illustrating a seventh example of the arrangement of each of the constituent elements on the TFT substrate, with respect to all the embodiments.

In the first to sixth examples, the drive circuit 40 for driving the pixel transistors 30 is formed on the TFT substrate 5, but the configuration is not limited thereto. The drive circuit 40 may be provided on a substrate (a substrate other than the TFT substrate 5) connected to the input pad group 20. Thus, a configuration in which the drive circuit 40 for driving the pixel transistors 30 is not provided on the TFT substrate 5 will be described as a seventh example (see FIG. 9). In the seventh example, the input pad group 20 is provided in the frame region along the first side, and a sampling circuit 60 including the pixel transistors 30 is provided in the frame region along the second side. Note that the configuration illustrated in FIG. 9 is a configuration obtained by replacing the pixel transistors 30 and the drive circuit 40 in the first example with the sampling circuit 60 including the pixel transistors 30. However, a configuration obtained by replacing the pixel transistors 30 and the drive circuit 40 in each of the second to sixth examples with the sampling circuit 60 including the pixel transistors 30 can also be employed.

0.2.8 Summary

As described above, in all of the first to seventh examples, the input pad group 20, to which the drive signal group for driving the plurality of pixel transistors 30 respectively corresponding to the plurality of pixel electrodes in the display region 10 is input, is provided on one end portion on the TFT substrate (panel substrate) 5, and the plurality of pixel transistors 30 are provided only in a region other than the region between the input pad group 20 and the display region 10, of the region on the TFT substrate (panel substrate) 5.

0.3 Configuration of Display Region

Figure 10:
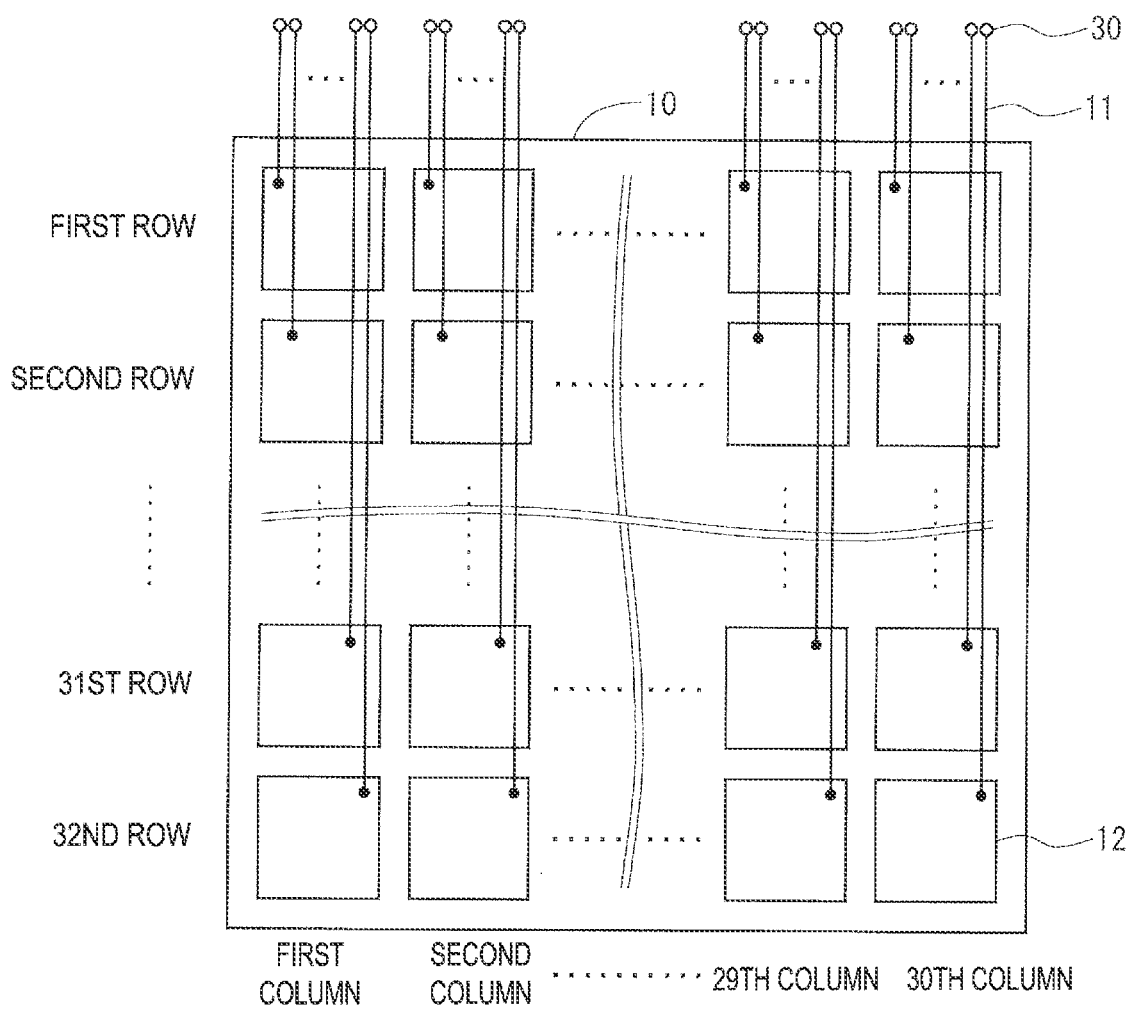
FIG. 10 is a diagram for describing a schematic configuration of a display region in all the embodiments.

Next, a schematic configuration of the display region 10 in all the embodiments will be described with reference to FIG. 10. In the display region 10, a plurality of pixel electrodes 12 are formed so as to correspond to the plurality of unit display regions 19 described above in a one-to-one manner. Note that, in each of the following embodiments, it is assumed that 960 of the pixel electrodes 12 (32 rows×30 columns of the pixel electrodes 12 (see FIG. 10)) are formed in the display region 10.

In a typical liquid crystal display device, pixel transistors are provided in a display region, but in the liquid crystal display devices according to all the embodiments described herein, the pixel transistors 30 are not provided in the display region 10, but are provided outside the display region 10. As illustrated in FIG. 10, 960 of the pixel wiring lines 11, which connect 960 of the pixel transistors 30 provided outside the display region 10 to the 960 pixel electrodes 12 formed in the display region 10, are disposed on the TFT substrate 5.

Figure 11:
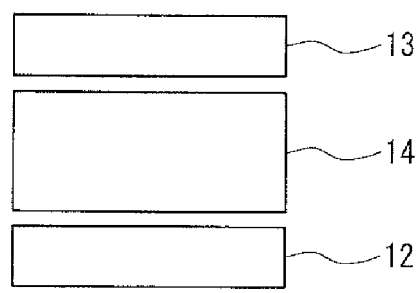
FIG. 11 is a diagram for describing a structure of a pixel with respect to all the embodiments.

FIG. 11 is a schematic view illustrating a structure of the pixel in all the embodiments. As illustrated in FIG. 11, the pixel electrode 12 formed on the TFT substrate 5 and a common electrode 13 formed on a counter substrate face each other, and a liquid crystal layer 14 is provided so as to be sandwiched between the pixel electrode 12 and the common electrode 13. The common electrode 13 is a single electrode that is commonly used by all the pixels, and a common electrode drive signal VCOM whose voltage level changes between a high level and a low level at a predetermined interval is provided to the common electrode 13 in order to suppress deterioration of liquid crystal.

0.4 Effects

According to the configuration as described above, of the region on the TFT substrate 5, the plurality of pixel transistors 30 respectively corresponding to the plurality of pixel electrodes 12 in the display region 10 are disposed only in the region other than the region between the input pad group 20 and the display region 10.

Figure 12:
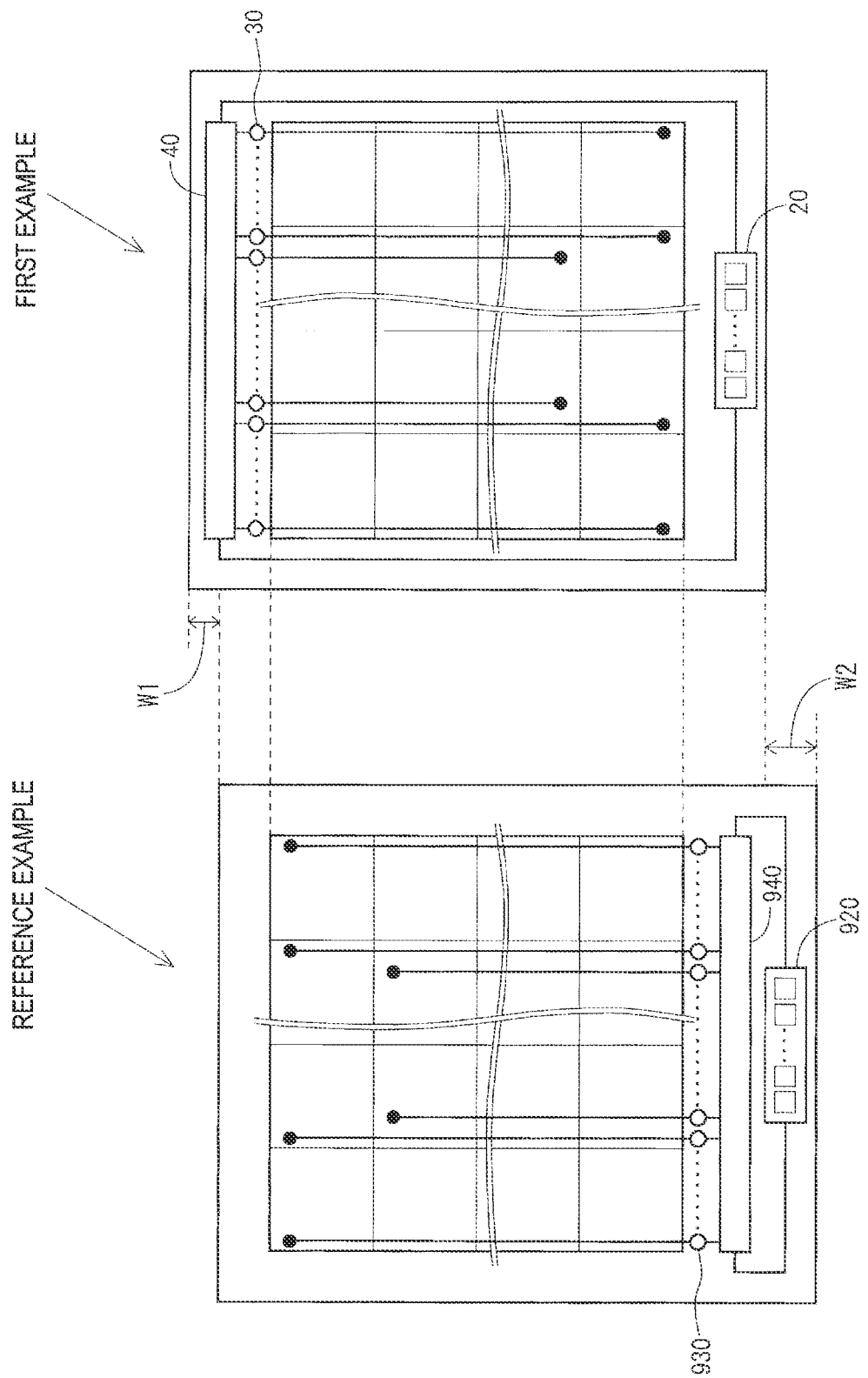
FIG. 12 is a diagram for describing an effect with respect to all the embodiments.

For example, in the first example, the input pad group 20 is provided in the frame region along the first side, and the pixel transistors 30 and the drive circuit 40 are provided only in the frame region along the second side (see FIG. 1). When comparing the configuration according to the reference example (see FIG. 43) with the configuration according to the first example, the width (the length in the vertical direction in the drawing) of the frame region along the second side in the first example is longer than that of the reference example by W1, as illustrated in FIG. 12. However, the width (the length in the vertical direction in the drawing) of the frame region along the first side in the first example is shorter than that of the reference example by W2. Here, W2 is longer than W1. Therefore, according to the first example, the size of the frame region can be made smaller than that of the reference example as a whole. The same applies to the fourth example (see FIG. 6).

Figure 13:
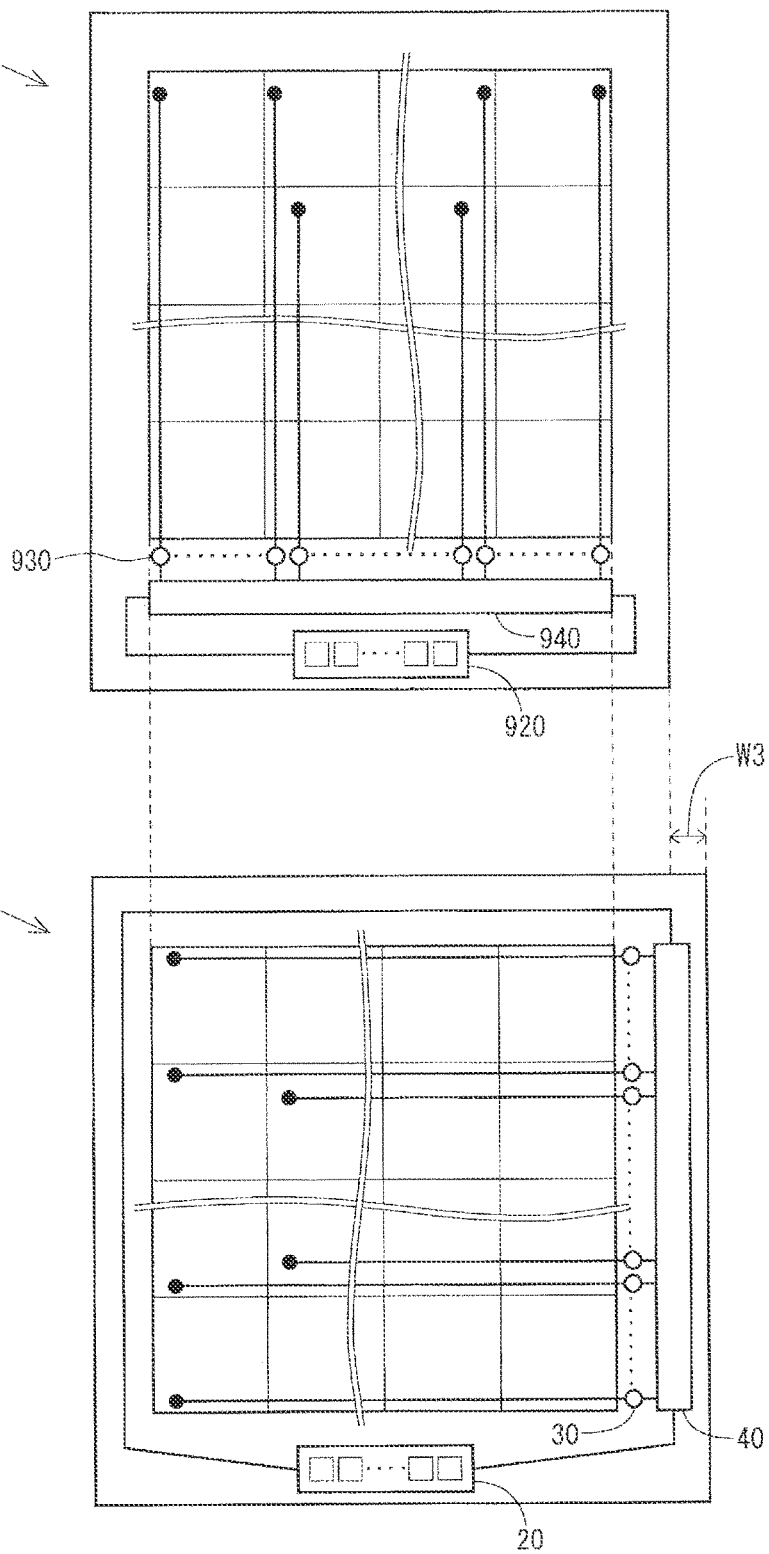
FIG. 13 is a diagram for describing an effect with respect to all the embodiments.
Figure 14:
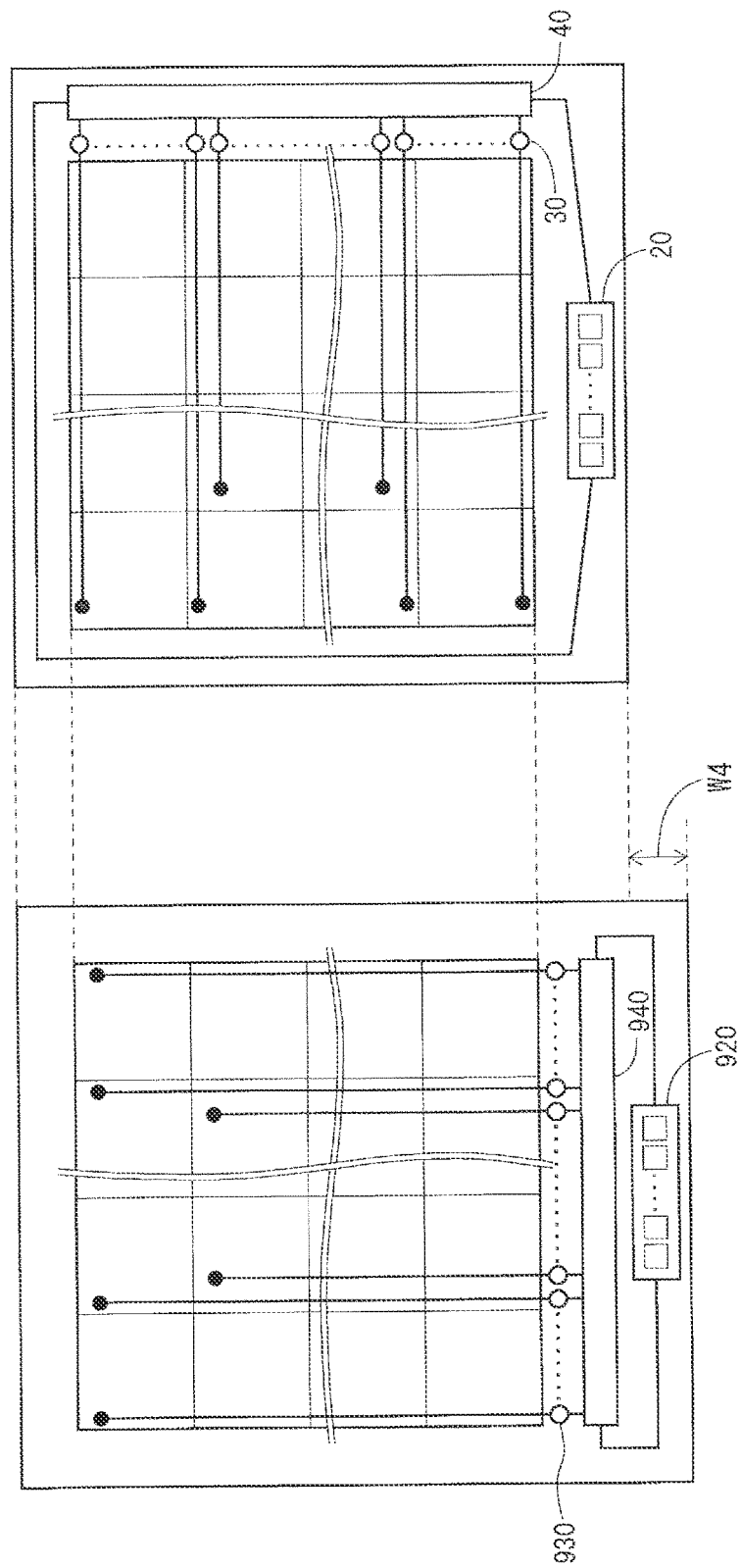
FIG. 14 is a diagram for describing an effect with respect to all the embodiments.

Further, for example, in the second example, the input pad group 20 is provided in the frame region along the first side, and the pixel transistors 30 and the drive circuit 40 are provided only in the frame region along the fourth side (see FIG. 3). When comparing the configuration according to the reference example with the configuration according to the second example, the width (the length in the vertical direction in the drawing) of the frame region along the fourth side in the second example is longer than that of the reference example by W3, as illustrated in FIG. 13. However, the width (the length in the vertical direction in the drawing) of the frame region along the first side in the second example is shorter than that of the reference example by W4, as illustrated in FIG. 14. Here, W4 is longer than W3. Therefore, according to the second example, the size of the frame region can be made smaller than that of the reference example as a whole. The same applies to the third example (see FIG. 4), the fifth example (see FIG. 7), and the sixth example (see FIG. 8).

Furthermore, according to the seventh example (see FIG. 9), the drive circuit 40 for driving the pixel transistors 30 is not provided on the TFT substrate 5, and thus the size of the frame region can be made significantly smaller than that of the reference example.

As described above, with regard to the configuration in which the pixel transistors 30 are provided outside the display region 10, the size of the frame region can be made smaller than that of the reference example in all of the first to seventh examples. Further, since the pixel transistors 30 are not present in the display region 10, a sufficient aperture ratio can be obtained. As described above, in all the embodiments, a liquid crystal display device capable of obtaining a sufficient aperture ratio while suppressing an increase in the size of the frame region is realized.

1. First Embodiment

A first embodiment will be described. In the present embodiment, as in the first to sixth examples described above, the plurality of pixel transistors 30 are provided in the region between the display region 10 and the drive circuit 40.

1.1 Configuration Regarding Driving of Pixel Wiring Lines

Figure 15:
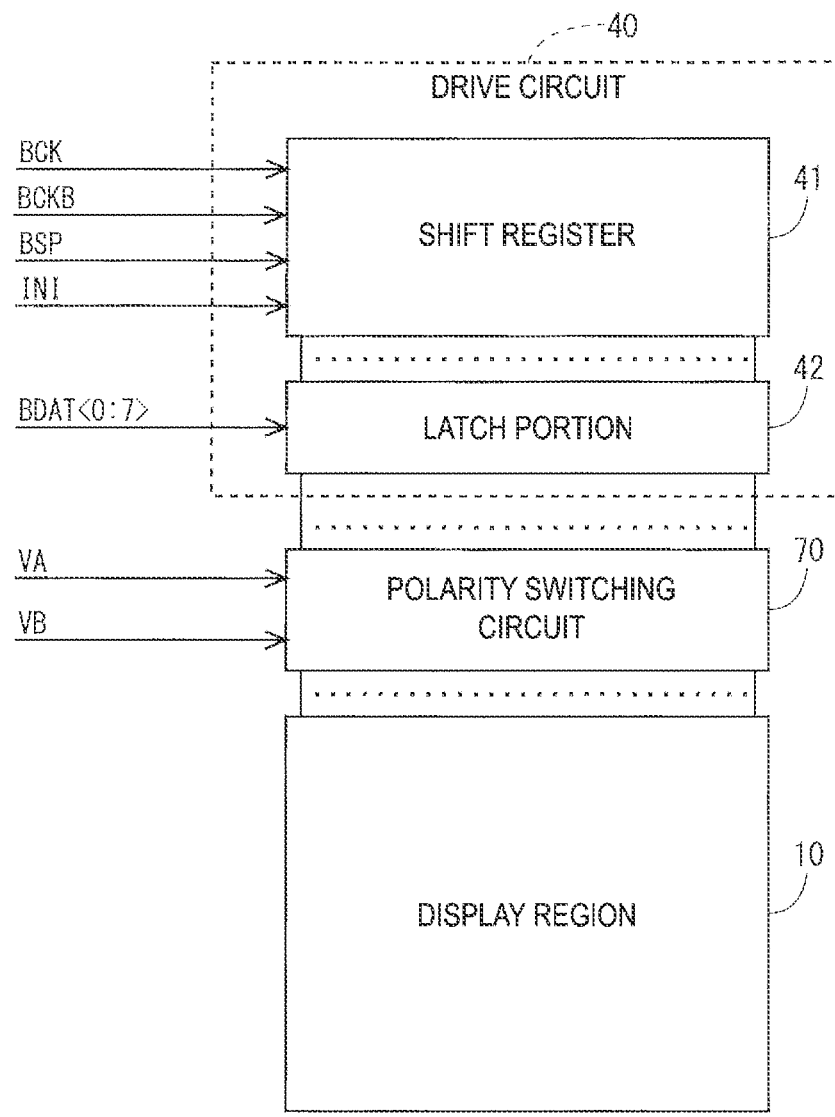
FIG. 15 is a functional block diagram for describing a configuration regarding driving of pixel wiring lines in a first embodiment.

A configuration regarding driving of the pixel wiring lines 11 will be described with reference to FIG. 15. As illustrated in FIG. 15, the drive circuit 40 and a polarity switching circuit 70 are provided in a region outside the display region 10, as constituent elements related to the driving of the pixel wiring lines 11. The drive circuit 40 includes a shift register 41 and a latch portion 42. Note that the pixel transistors 30 are included in the polarity switching circuit 70.

A control clock signal BCK, a control clock signal BCKB, a start pulse signal BSP, and an initialization signal INI are provided to the shift register 41 via a signal wiring line group 51. The internal state of the shift register 41 is initialized on the basis of the initialization signal INI. The shift register 41 performs a shift operation on the basis of the control clock signal BCK, the control clock signal BCKB, and the start pulse signal BSP. Then, on the basis of the shift operation, an output signal from each of unit circuits described below is output as a timing signal, which represents a capturing timing of a data signal.

A data signal BDAT<0:7> representing binary data is provided to the latch portion 42 via the signal wiring line group 51. Note that the data signal BDAT<0:7> is 8-bit data. The latch portion 42 includes a plurality of latch circuits, and each of the latch circuits captures a corresponding data signal on the basis of the corresponding timing signal (the timing signal output from the shift register 41), and outputs the data signal captured.

A white display voltage VA and a black display voltage VB are provided to the polarity switching circuit 70 via the signal wiring line group 51. With regard to the white display voltage VA and the black display voltage VB, the voltage levels thereof change in a mutually inverted manner between the high level (first level) and the low level (second level) at the predetermined interval. The polarity switching circuit 70 includes a plurality of polarity controllers respectively corresponding to the plurality of pixel wiring lines 11 in the display region 10, and each of the polarity controllers applies one of the white display voltage VA and the black display voltage VB to the corresponding pixel wiring line 11, on the basis of the data signal output from the corresponding latch circuit. Note that, in the present embodiment, a first voltage is realized by the white display voltage VA, and a second voltage is realized by the black display voltage VB.

As a result of the voltage (the white display voltage VA or the black display voltage VB) corresponding to the data signal BDAT<0:7> being applied to each of the pixel electrodes 12 as described above, a desired image is displayed on the display region 10.

1.2 Detailed Configuration of Drive Circuit

Figure 16:
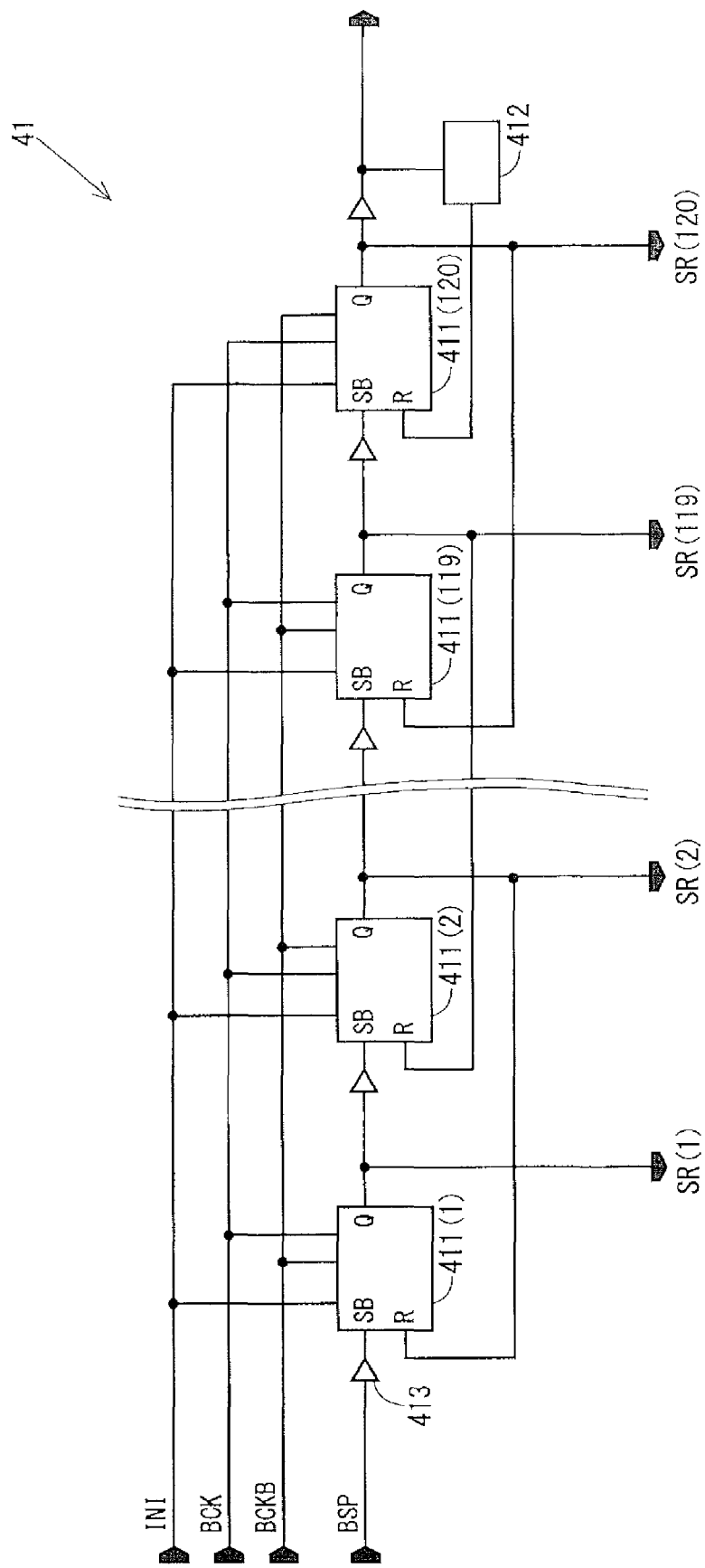
FIG. 16 is a block diagram illustrating a configuration of a shift register in the first embodiment.

FIG. 16 is a circuit diagram illustrating a detailed configuration of the shift register 41. As illustrated in FIG. 16, the shift register 41 is constituted by 120 unit circuits 411(1) to 411(120) connected in series, a reset signal generation circuit 412, and a plurality of buffers 413. Each of the unit circuits 411 is a flip-flop circuit. As described above, the control clock signal BCK, the control clock signal BCKB, the start pulse signal BSP, and the initialization signal INI are provided to the shift register 41. The state of the unit circuits 411(1) to 411(120) is initialized on the basis of the initialization signal INI. An output signal Q and a set signal SB from the unit circuit 411 at the preceding stage are provided to each of the unit circuits 411, and the output signal Q from the unit circuit 411 at the next stage is provided to each of the unit circuits 411 as a reset signal R. However, the start pulse signal BSP is provided to the unit circuit 411(1) at the first stage as the set signal SB, and a signal generated by the reset signal generation circuit 412 is provided to the unit circuit 411(120) at the 120th stage as the reset signal R. In each of the unit circuits 411, after the set signal SB is set to the high level, the output signal Q is set to the high level on the basis of the control clock signals BCK and BCKB (in other words, a shift pulse is output). Then, as a result of the reset signal R being set to the high level, the output signal Q is set to the low level.

Figure 17:
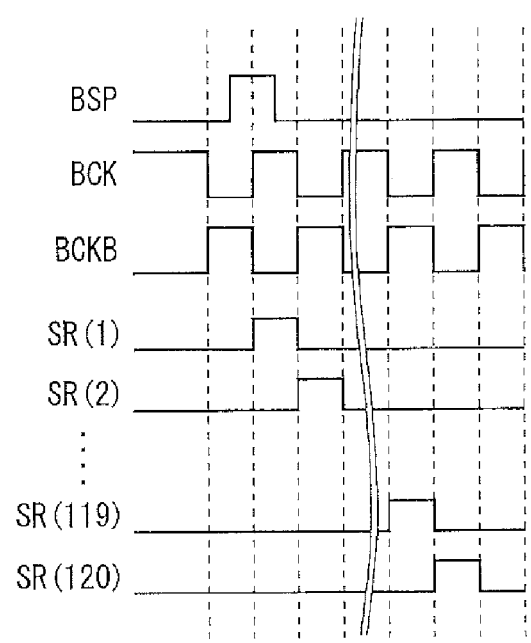
FIG. 17 is a signal waveform diagram for describing an operation of the shift register in the first embodiment.

Since the unit circuits 411 operate as described above, after the pulse of the start pulse signal BSP is generated, the output signals Q from the unit circuits 411 are set to the high level stage by stage, on the basis of the control clock signals BCK and BCKB. In other words, the high-level output signal Q output from each of the unit circuits 411 is transferred sequentially from the first stage to the 120th stage, as a shift pulse. Further, the output signal Q from each of the unit circuits 411 is provided to the unit circuits 411 at the next stage and at the preceding stage, and is also provided to the latch circuit as the timing signal SR. As described above, after the pulse of the start pulse signal BSP is generated, on the basis of the control clock signals BCK and BCKB, the timing signals SR are sequentially set to the high level for a predetermined time period each time, in the order of "the timing signal SR(1), the timing signal SR(2), . . . , the timing signal SR(119), and the timing signal SR(120)", as illustrated in FIG. 17.

Figure 18:
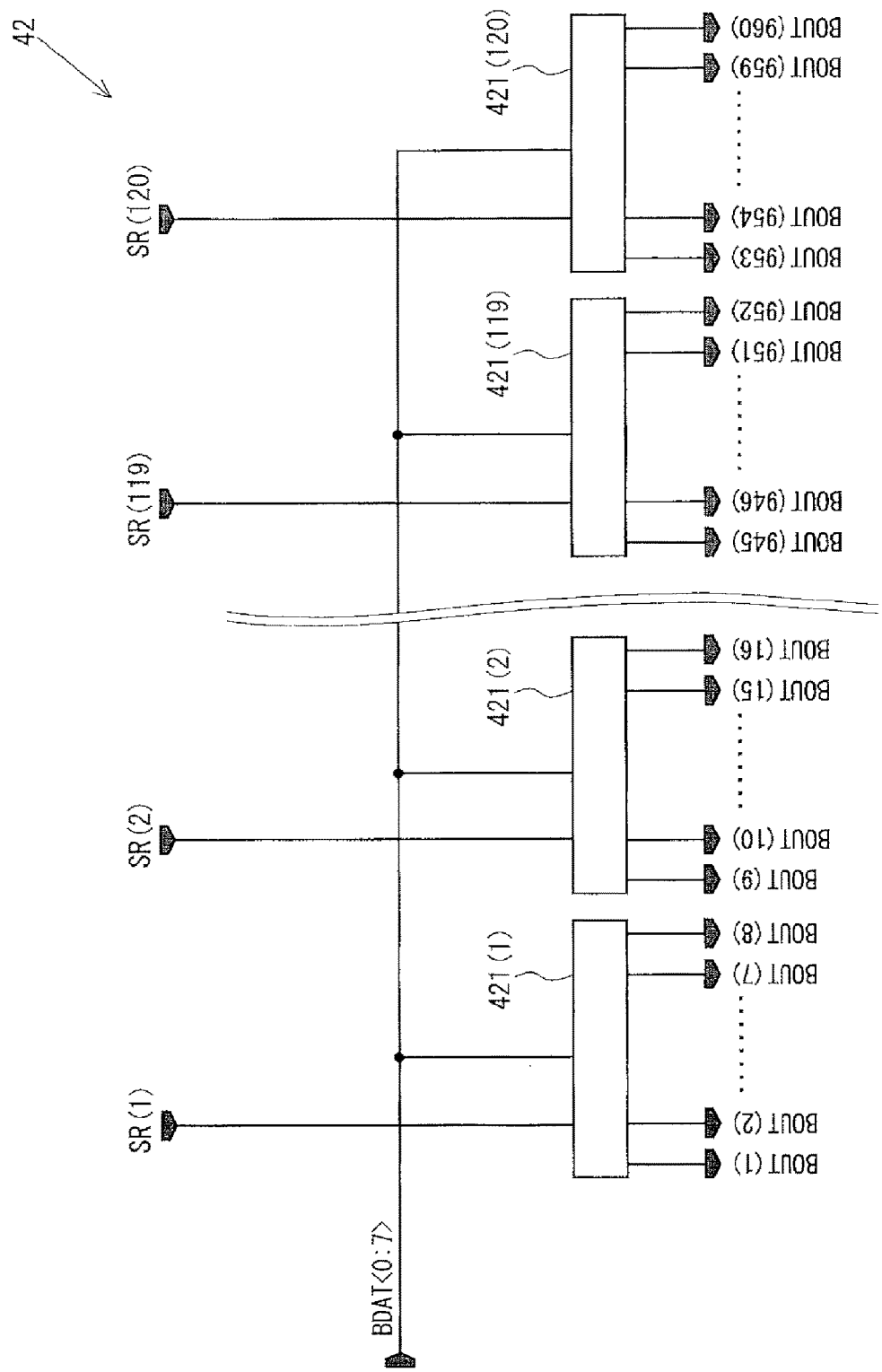
FIG. 18 is a block diagram illustrating a configuration of a latch portion in the first embodiment.

FIG. 18 is a block diagram illustrating a configuration of the latch portion 42. As illustrated in FIG. 18, the latch portion 42 is constituted by 120 latch circuit groups 421(1) to 421(120). Each of the latch circuit groups 421 includes eight of the latch circuits. Therefore, 960 of the latch circuits are provided in total. The data signal BDAT<0:7> and the timing signal SR output from the shift register 41 are provided to each of the latch circuit groups 421. When the input timing signal SR changes from the low level to the high level, each of the latch circuit groups 421 captures the data signal BDAT<0:7>, and outputs the data signal captured. Note that the data signal output from the latch circuit is denoted by a reference sign BOUT. Since the timing signals SR are set to the high level in the order of "the timing signal SR(1), the timing signal SR(2), . . . , the timing signal SR(119), and the timing signal SR(120)" as described above (see FIG. 17), the capturing of the data signal BDAT<0:7> at the latch circuit group is performed in the order of "the latch circuit group 421(1), the latch circuit group 421(2), . . . , the latch circuit group 421(119), and the latch circuit group 421(120)".

As described above, after the pulse of the start pulse signal BSP is generated, the capturing of the data signal BDAT<0:7> by the latch circuit group 421 is performed every time the logic levels of the control clock signal BCK and the control signal BCKB are inverted. In other words, when the logic levels of the control clock signal BCK and the control signal BCKB are inverted once, 8 bits of data are captured by the latch circuit group 421. Thus, after the pulse of the start pulse signal BSP is generated, at a time point when the logic levels of the control clock signal BCK and the control signal BCKB have been inverted 120 times, the capturing of the data corresponding to all the pixel electrodes 12 by the latch circuits is complete.

Figure 19:
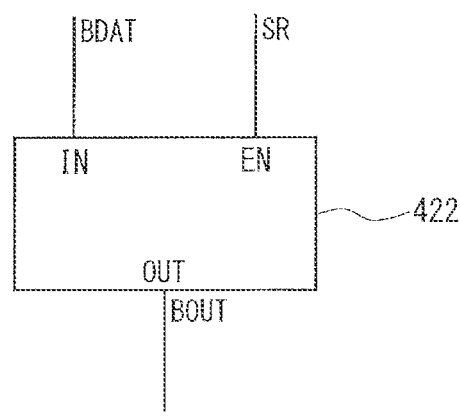
FIG. 19 is a diagram for describing a schematic configuration of one latch circuit in the first embodiment.

FIG. 19 is a diagram for describing a schematic configuration of one latch circuit (a latch circuit corresponding to 1 bit of data) 422. The data signal BDAT of 1 bit is provided to the latch circuit 422 as an input signal IN, and the timing signal SR output from the shift register 41 is provided to the latch circuit 422 as an enable signal EN. Then, an output signal OUT output from the latch circuit 422 is provided to the polarity switching circuit 70 as the data signal BOUT.

Figure 20:
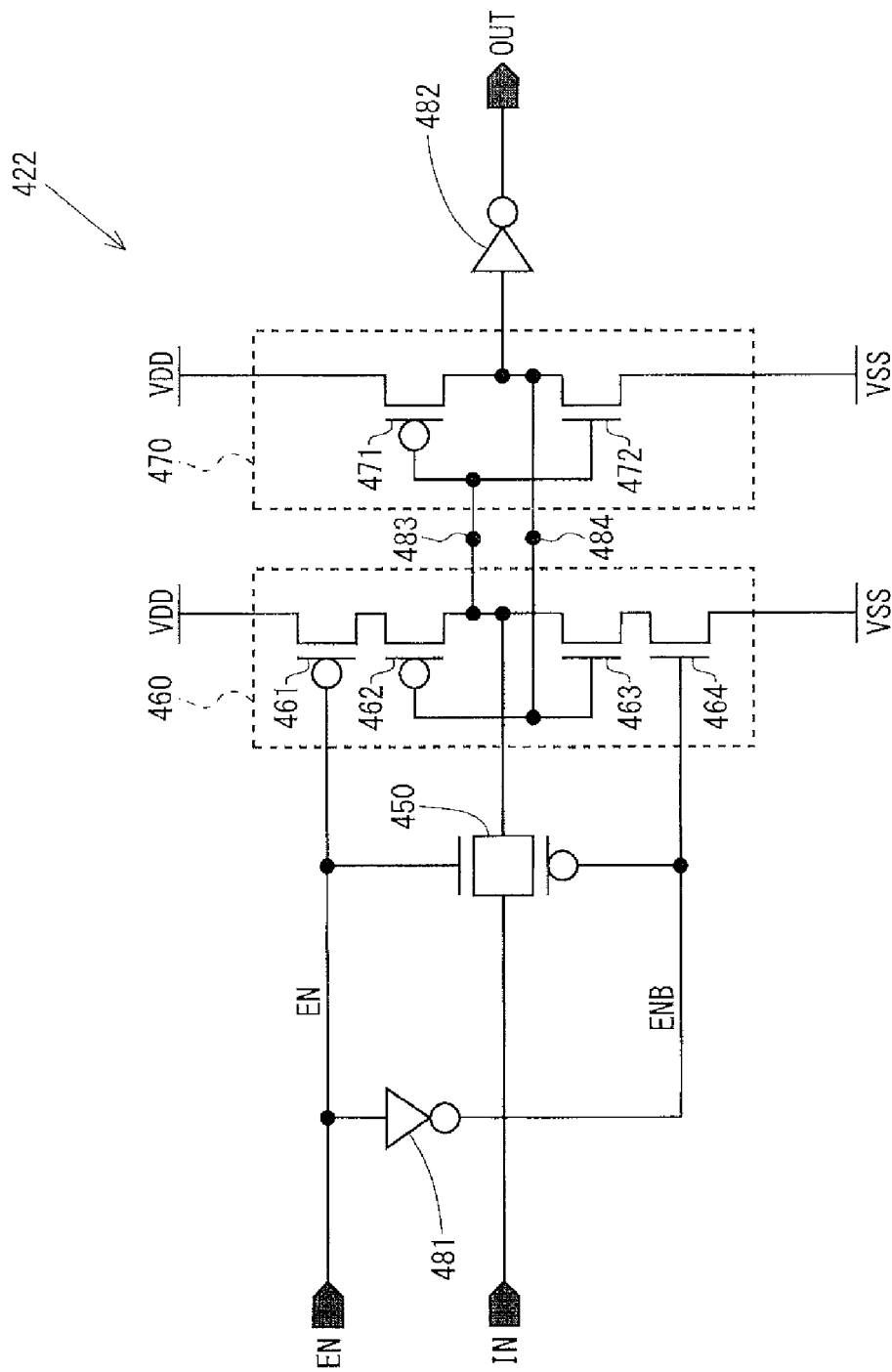
FIG. 20 is a circuit diagram illustrating a detailed configuration of one latch circuit in the first embodiment.

FIG. 20 is a circuit diagram illustrating a detailed configuration of one latch circuit 422. Note that the configuration described here is merely an example, and the configuration is not limited to this example. The latch circuit 422 includes an inverter 481, a CMOS switch 450 constituted by an n-channel transistor and a p-channel transistor, a clocked inverter 460 constituted by a p-channel transistor 461, a p-channel transistor 462, an n-channel transistor 463, and an n-channel transistor 464, a CMOS inverter 470 constituted by a p-channel transistor 471 and an n-channel transistor 472, and an inverter 482.

The enable signal EN input to the latch circuit 422 is provided to a gate terminal of the n-channel transistor constituting the CMOS switch 450. Further, as a result of the inverter 481 being provided as illustrated in FIG. 20, an inverted enable signal ENB is provided to a gate terminal of the p-channel transistor constituting the CMOS switch 450. In the configuration described above, when the enable signal EN is at the high level, the CMOS switch 450 is set to the on state, and thus, the input signal IN is provided to the clocked inverter 460. On the other hand, when the enable signal EN is at the low level, the CMOS switch 450 is set to the off state, and thus, the input signal IN is not provided to the clocked inverter 460.

An input terminal of the clocked inverter 460 is connected to a node 484, and an output terminal thereof is connected to a node 483. An input terminal of the CMOS inverter 470 is connected to the node 483, and an output terminal thereof is connected to the node 484. Further, when the enable signal EN is at the low level, both the p-channel transistor 461 and the n-channel transistor 464 are set to the on state, and when the enable signal EN is at the high level, both the p-channel transistor 461 and the n-channel transistor 464 are set to the off state. In the configuration described above, the value of the input signal IN input to the latch circuit 422 when the enable signal EN is at the high level is held by the clocked inverter 460 and the CMOS inverter 470, throughout a period until the enable signal EN is set to the high level once again. Incidentally, when the input signal IN is at the high level, the potential of the node 483 is set to the high level, and the output signal OUT is also set to the high level. On the other hand, when the input signal IN is at the low level, the potential of the node 483 is set to the low level, and the output signal OUT is also set to the low level.

Note that, as described above, in the present embodiment, eight of the latch circuits 422 are included in each of the latch circuit groups 421. In other words, the eight latch circuits 422 are provided for one timing signal. However, the configuration is not limited thereto, and a configuration can be adopted in which the drive circuit 40 includes M latch circuits 422 for one timing signal, M being an integer of 2 or more. In this case, the M latch circuits 422 capture M data signals (M bits of data) based on the corresponding timing signals SR, and output the M data signals captured.

1.3 Detailed Configuration of Polarity Switching Circuit

Figure 21:
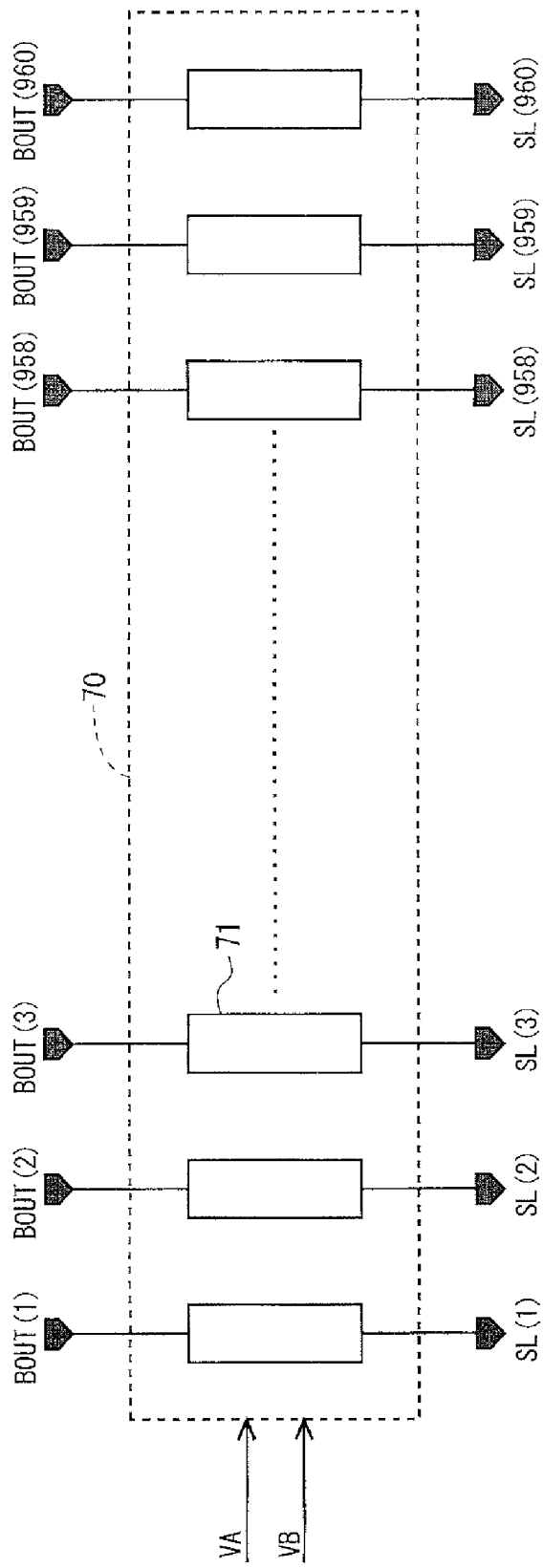
FIG. 21 is a block diagram illustrating a schematic configuration of a polarity switching circuit in the first embodiment.

FIG. 21 is a block diagram illustrating a schematic configuration of the polarity switching circuit 70. As illustrated in FIG. 21, the polarity switching circuit 70 is constituted by 960 polarity controllers 71 corresponding to 960 of the pixel wiring lines 11, respectively. Based on the data signal BOUT, each of the polarity controllers 71 outputs one of the white display voltage VA and the black display voltage VB, as the data signal SL to be applied to the pixel wiring line 11.

Figure 22:
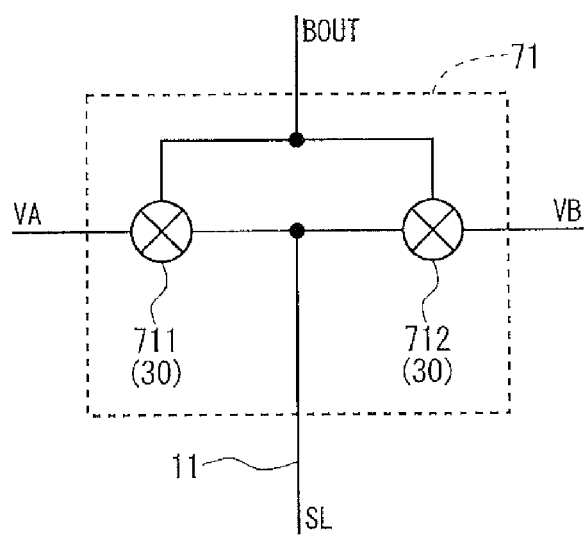
FIG. 22 is a circuit diagram illustrating a schematic configuration of a polarity controller in the first embodiment.

FIG. 22 is a diagram illustrating a schematic configuration of the polarity controller 71. As illustrated in FIG. 22, the polarity controller 71 includes two switches 711 and 712 for which the on/off state is controlled on the basis of the data signal BOUT. The on/off states of the switch 711 and the switch 712 change in a mutually inverted manner. The two switches 711, 712 function as the pixel transistors 30. For example, when the data signal BOUT is at the high level, the switch 711 is set to the off state and the switch 712 is set to the on state, and when the data signal BOUT is at the low level, the switch 711 is set to the on state and the switch 712 is set to the off state. As a result, when the data signal BOUT is at the high level, the black display voltage VB is applied to the pixel wiring line 11 as the data signal SL, and when the data signal BOUT is at the low level, the white display voltage VA is applied to the pixel wiring line 11 as the data signal SL. Two detailed configuration examples of the polarity controller 71 will be described below.

Figure 23:
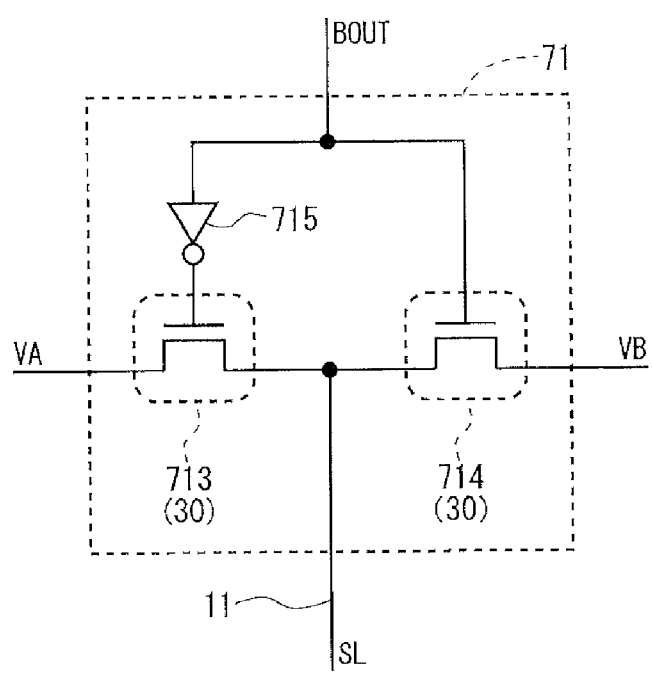
FIG. 23 is a circuit diagram illustrating a detailed configuration of the polarity controller that uses a one-side channel switch in the first embodiment.

FIG. 23 is a circuit diagram illustrating a detailed configuration of the polarity controller 71 that uses a one-side channel switch. As illustrated in FIG. 23, the polarity controller 71 is constituted by an n-channel transistor 713, an n-channel transistor 714, and an inverter 715. The n-channel transistor 713 and the n-channel transistor 714 function as the pixel transistors 30. The data signal BOUT is provided to an input terminal of the inverter 715, and an output terminal of the inverter 715 is connected to a control terminal of the n-channel transistor 713. The data signal BOUT is provided to a control terminal of the n-channel transistor 714. The white display voltage VA is provided to a first conduction terminal of the n-channel transistor 713, and a second conduction terminal of the n-channel transistor 713 is connected to the pixel wiring line 11. The black display voltage VB is provided to a first conduction terminal of the n-channel transistor 714, and a second conduction terminal of the n-channel transistor 714 is connected to the pixel wiring line 11.

According to the configuration described above, when the data signal BOUT is at the high level, the n-channel transistor 713 is set to the off state and the n-channel transistor 714 is set to the on state, and thus, the black display voltage VB is applied to the pixel wiring line 11 as the data signal SL. On the other hand, when the data signal BOUT is at the low level, the n-channel transistor 713 is set to the on state and the n-channel transistor 714 is set to the off state, and thus, the white display voltage VA is applied to the pixel wiring line 11 as the data signal SL.

Note that, in the example illustrated in FIG. 23, a first pixel transistor is realized by the n-channel transistor 713, and a second pixel transistor is realized by the n-channel transistor 714.

Figure 24:
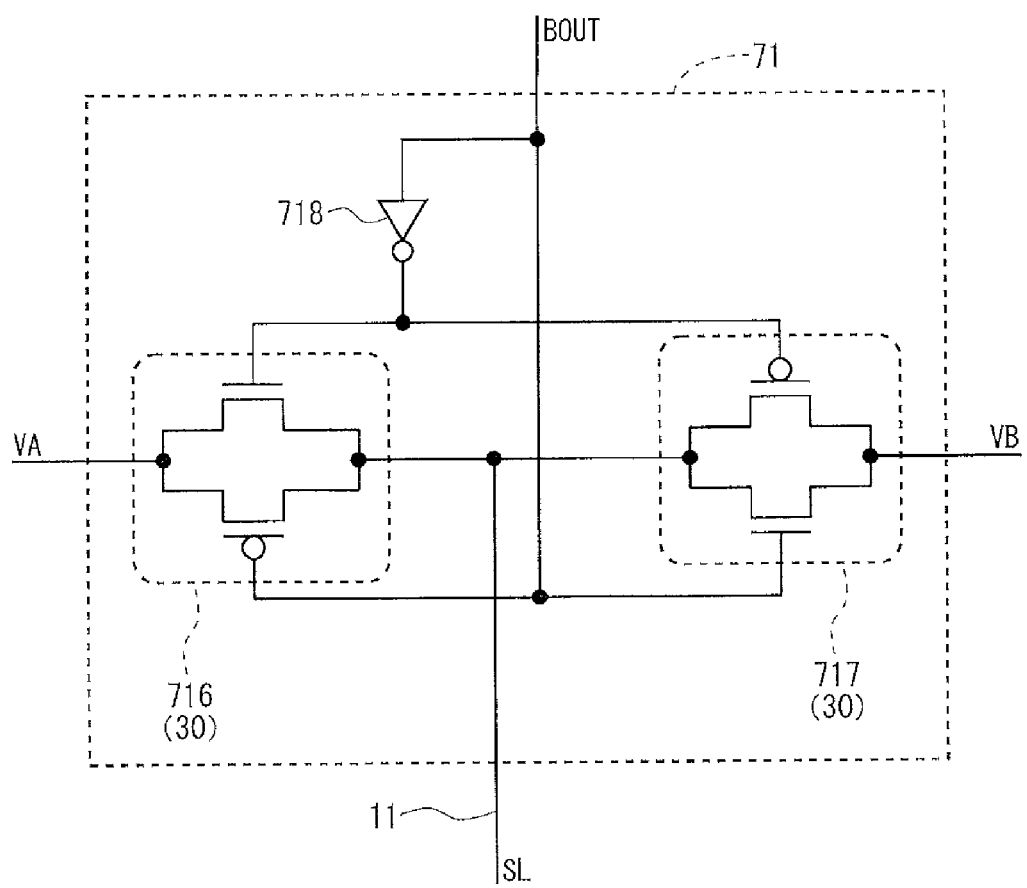
FIG. 24 is a circuit diagram illustrating a detailed configuration of the polarity controller that uses a CMOS switch in the first embodiment.

FIG. 24 is a circuit diagram illustrating a detailed configuration of the polarity controller 71 that uses a CMOS switch. As illustrated in FIG. 24, the polarity controller 71 is constituted by a CMOS switch 716, a CMOS switch 717, and an inverter 718. The CMOS switch 716 and the CMOS switch 717 function as the pixel transistors 30. The data signal BOUT is provided to an input terminal of the inverter 718, and an output terminal of the inverter 718 is connected to a control terminal of an n-channel transistor constituting the CMOS switch 716, and to a control terminal of a p-channel transistor constituting the CMOS switch 717. The data signal BOUT is provided to a control terminal of a p-channel transistor constituting the CMOS switch 716, and a control terminal of an n-channel transistor constituting the CMOS switch 717. The white display voltage VA is provided to an input terminal of the CMOS switch 716, and an output terminal of the CMOS switch 716 is connected to the pixel wiring line 11. The black display voltage VB is provided to an input terminal of the CMOS switch 717, and an output terminal of the CMOS switch 717 is connected to the pixel wiring line 11.

According to the configuration described above, when the data signal BOUT is at the high level, the CMOS switch 716 is set to the off state and the CMOS switch 717 is set to the on state, and thus, the black display voltage VB is applied to the pixel wiring line 11 as the data signal SL. On the other hand, when the data signal BOUT is at the low level, the CMOS switch 716 is set to the on state and the CMOS switch 717 is set to the off state, and thus, the white display voltage VA is applied to the pixel wiring line 11 as the data signal SL.

Note that, in the example illustrated in FIG. 24, the first pixel transistor is realized by the n-channel transistor and the p-channel transistor constituting the CMOS switch 716, and the second pixel transistor is realized by the n-channel transistor and the p-channel transistor constituting the CMOS switch 717.

Figure 25:
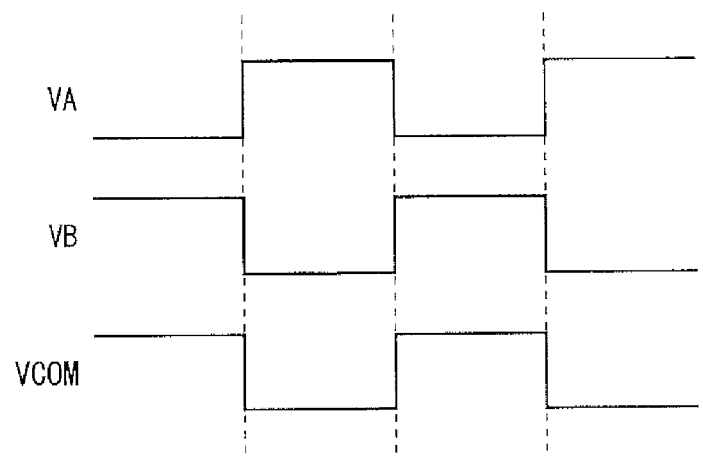
FIG. 25 is a signal waveform diagram for describing switching of polarities of a liquid crystal applied voltage in the first embodiment.

FIG. 25 is a signal waveform diagram for describing switching of polarities of a liquid crystal applied voltage (a voltage applied to the liquid crystal layer 14). As illustrated in FIG. 25, with regard to the white display voltage VA and the black display voltage VB, the voltage levels thereof change in a mutually inverted manner between the high level and the low level at a predetermined interval. Further, with regard to the voltage level of the common electrode drive signal VCOM applied to the common electrode 13 also, the voltage level thereof changes between the high level and the low level at the predetermined interval. Here, a voltage of the positive polarity is applied to the liquid crystal layer 14 during a period in which the voltage level of the common electrode drive signal VCOM is at the low level. On the other hand, a voltage of the negative polarity is applied to the liquid crystal layer 14 during a period in which the voltage level of the common electrode drive signal VCOM is at the high level. Since the polarity of the liquid crystal applied voltage is inverted at the predetermined interval, deterioration of the liquid crystal is suppressed.

1.4 Effects

According to the present embodiment, since the polarity switching circuit 70 is provided as a constituent element related to the driving of the pixel wiring lines 11, even when the data signal that does not take into account the polarity of the liquid crystal applied voltage is input to the input pad group 20, since the polarity of the liquid crystal applied voltage is inverted at the predetermined interval, the deterioration of the liquid crystal is suppressed. Further, by disposing each of the constituent elements on the TFT substrate 5 as in the first to sixth examples described above, a sufficient aperture ratio is obtained while suppressing an increase in the size of the frame region. As described above, according to the present embodiment, a liquid crystal display device is realized that is capable of obtaining a sufficient aperture ratio while suppressing the deterioration of the liquid crystal and the increase in the size of the frame region.

2. Second Embodiment

A second embodiment will be described below. In the present embodiment also, as in the first to sixth examples described above, the plurality of pixel transistors 30 are provided in the region between the display region 10 and the drive circuit 40. Note that only points different from the first embodiment will be mainly described below.

2.1 Configuration Regarding Driving of Pixel Wiring Lines

Figure 26:
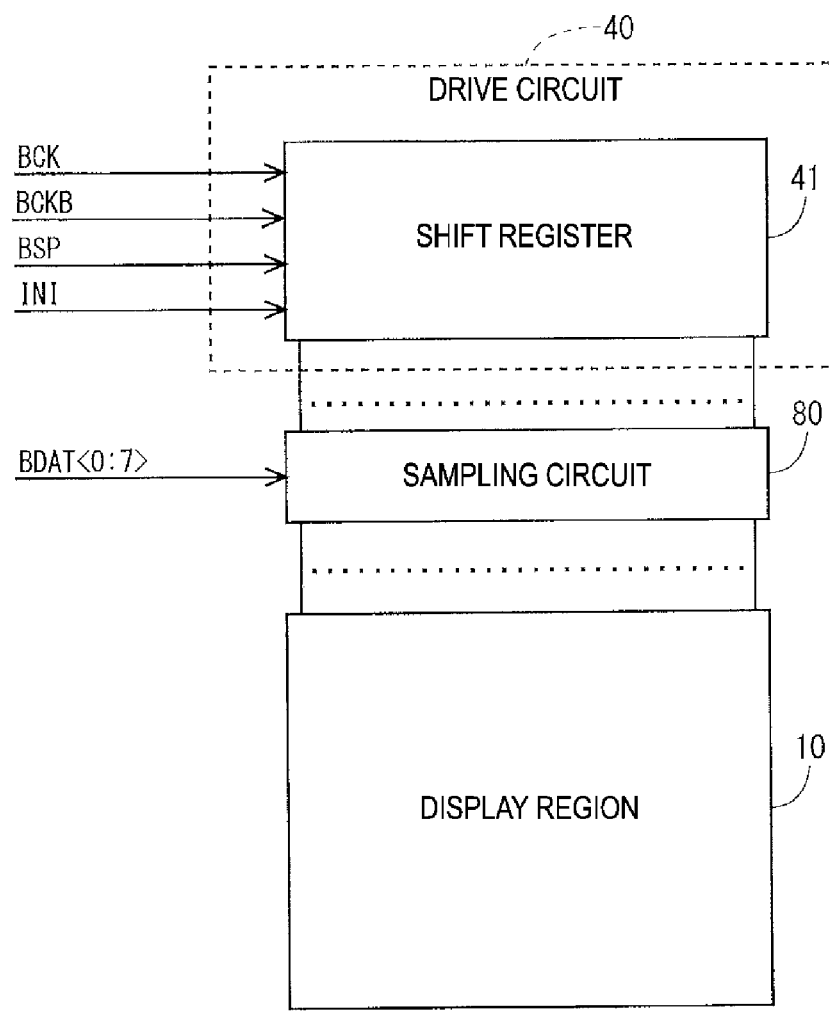
FIG. 26 is a functional block diagram for describing a configuration regarding driving of the pixel wiring lines in a second embodiment.

A configuration regarding the driving of the pixel wiring lines 11 will be described with reference to FIG. 26. As illustrated in FIG. 26, the drive circuit 40 and a sampling circuit 80 are provided in a region outside the display region 10, as constituent elements related to the driving of the pixel wiring lines 11. In the first embodiment, the drive circuit 40 includes the shift register 41 and the latch portion 42, but in the present embodiment, the drive circuit 40 includes only the shift register 41. Note that the pixel transistors 30 are included in the sampling circuit 80.

As in the first embodiment, the shift register 41 outputs the timing signal representing the capturing timing of the data signal. The data signal BDAT<0:7> is provided to the sampling circuit 80. In the sampling circuit 80, sampling of the data signal BDAT<0:7> is performed based on the timing signal output from shift register 41. Then, each of the data signals sampled by the sampling circuit 80 is applied to the corresponding pixel wiring line 11. As a result, the data signal is applied to each of the pixel electrodes 12, and a desired image is displayed on the display region 10.

2.2 Configuration of Sampling Circuit

Figure 27:
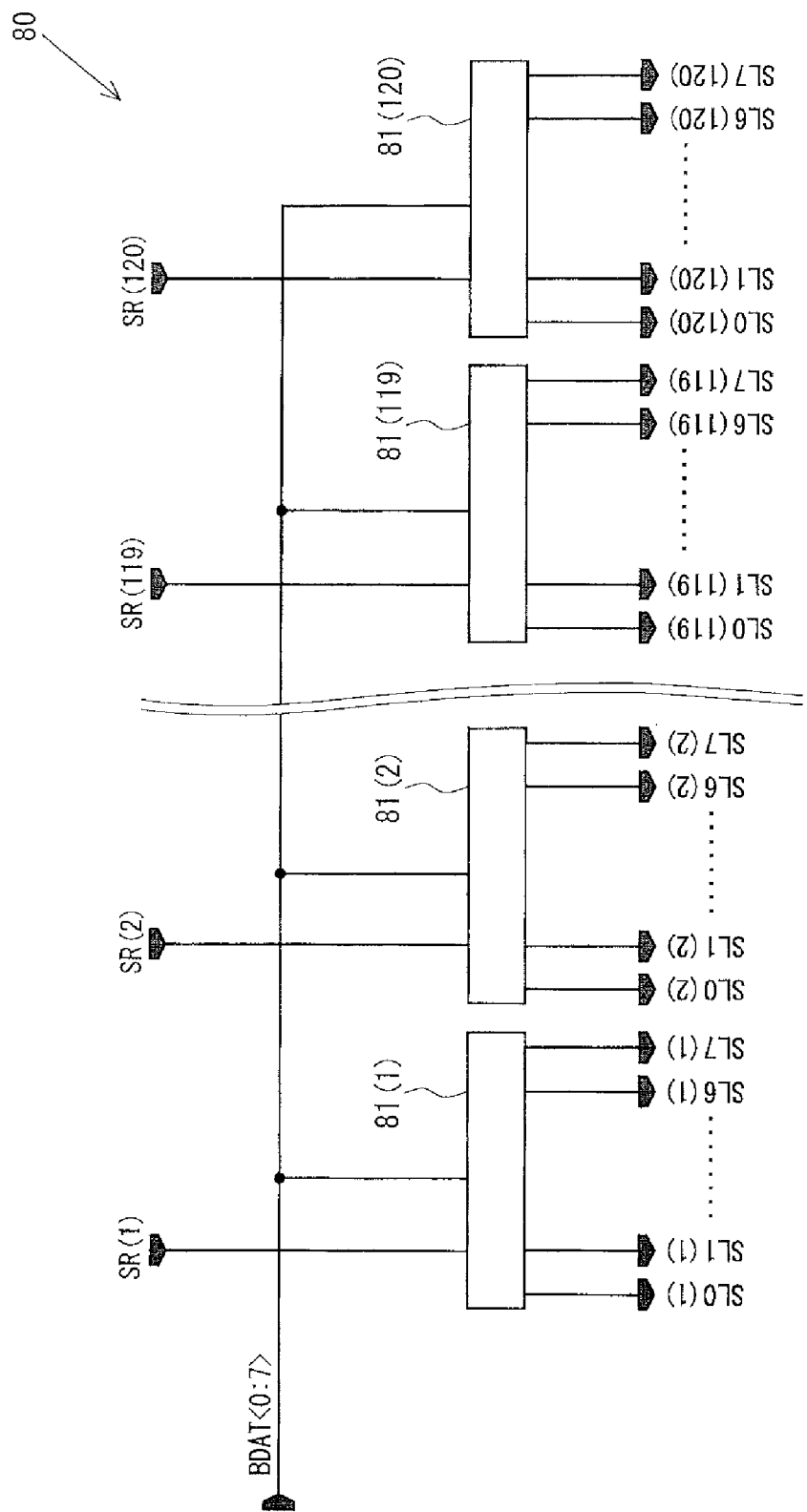
FIG. 27 is a block diagram illustrating a schematic configuration of a sampling circuit in the second embodiment.

FIG. 27 is a block diagram illustrating a configuration of the sampling circuit 80. As illustrated in FIG. 27, the sampling circuit 80 includes 120 unit sampling portions 81(1) to 81(120). Each of the unit sampling portions 81 corresponds to eight of the pixel wiring lines 11, and includes eight of the pixel transistors 30. The data signal BDAT<0:7> and the timing signal SR output from the shift register 41 are provided to each of the unit sampling portions 81. When the input timing signal SR changes from the low level to the high level, each of the unit sampling portions 81 performs the sampling of the data signal BDAT<0:7>. Since the timing signals SR are set to the high level in the order of "the timing signal SR(1), the timing signal SR(2), . . . , the timing signal SR(119), and the timing signal SR(120)" as illustrated in FIG. 17, the sampling of the data signal BDAT<0:7> is performed in the order of "the unit sampling portion 81(1), the unit sampling portion 81(2), . . . , the unit sampling portion 81(119), and the unit sampling portion 81(120)".

As described above, after the pulse of the start pulse signal BSP is generated, every time the logic levels of the control clock signal BCK and the control signal BCKB are inverted, the sampling of the data signal BDAT<0:7> is performed by the unit sampling portion 81. In other words, when the logic levels of the control clock signal BCK and the control signal BCKB are inverted once, 8 bits of data are sampled. Therefore, after the pulse of the start pulse signal BSF is generated, at the time point when the logic levels of the control clock signal BCK and the control signal BCKB have been inverted 120 times, the sampling of the data corresponding to all the pixel electrodes 12 is complete.

Note that, in the present embodiment, 960 of the pixel transistors 30 are grouped so that one group is formed by eight of the pixel transistors 30. Therefore, 120 groups are formed in total. When p is an integer from 0 to 7 and q is an integer from 1 to 120, in FIG. 27, the data signal corresponding to the p-th pixel transistor 30 of the q-th group (the data signal applied to the pixel wiring line 11) is denoted by a reference sign SLp(q).

Figure 28:
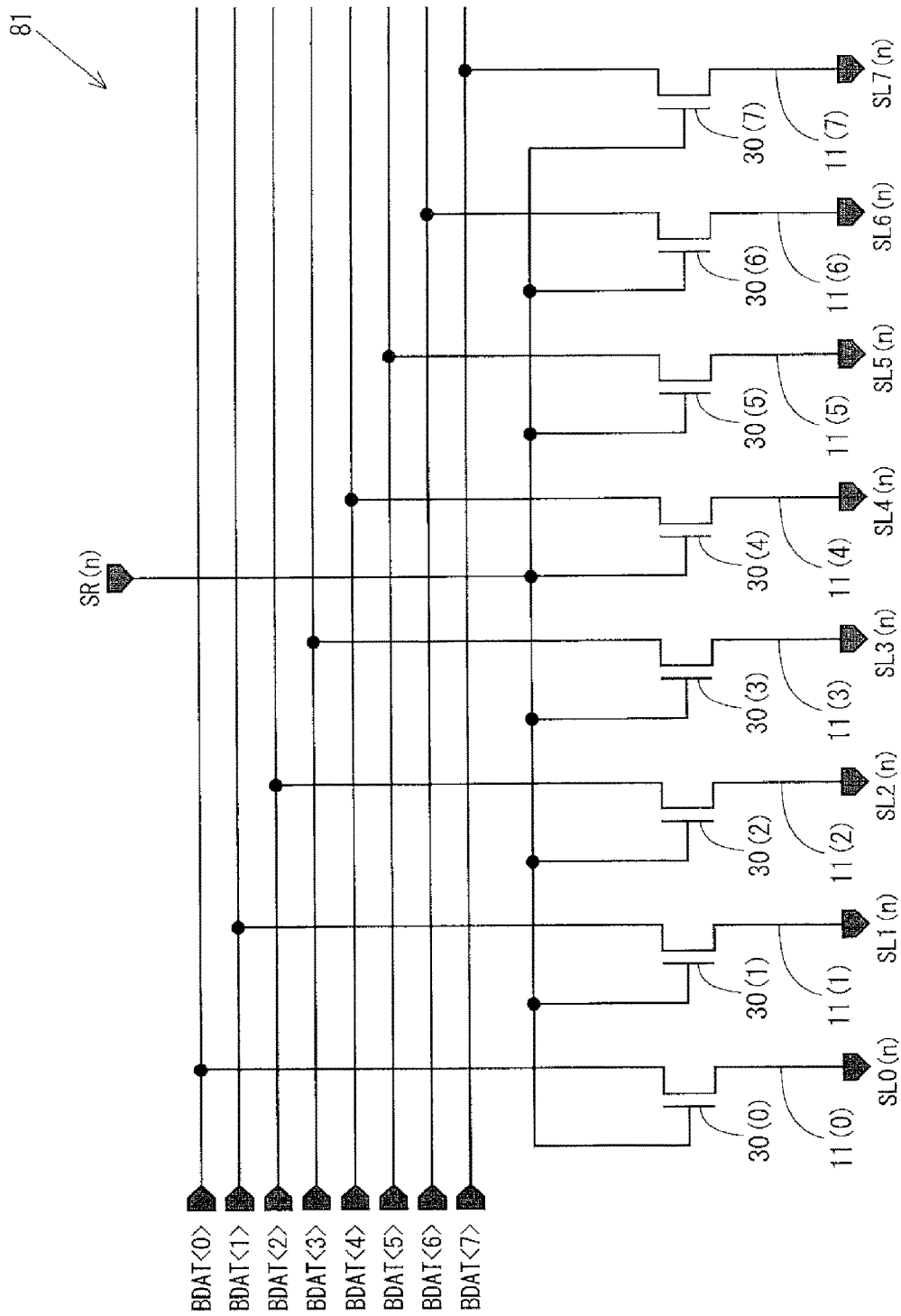
FIG. 28 is a circuit diagram illustrating a detailed configuration of a unit sampling portion in the second embodiment.

FIG. 28 is a circuit diagram illustrating a detailed configuration of the unit sampling portion 81. Note that the unit sampling portion 81 illustrated in FIG. 28 is the unit sampling portion 81 corresponding to the n-th group (n is an integer from 1 to 120). As illustrated in FIG. 28, the unit sampling portion 81 includes eight of the pixel transistors 30(0) to 30(7). A timing signal SR(n) is provided to a control terminal of each of the pixel transistors 30, the data signal BDAT (of 1 bit) is provided to a first conduction terminal thereof, and a second conduction terminal thereof is connected to the pixel wiring line 11. As can be seen from FIG. 28, the same timing signal SR is provided to the control terminal of each of the eight pixel transistors 30(0) to 30(7) forming the same group, and mutually different data signals BDAT are provided to the first conduction terminals of the eight pixel transistors 30(0) to 30(7) forming the same group.

In the configuration described above, when the timing signal SR(n) changes from the low level to the high level, the eight pixel transistors 30(0) to 30(7) are set to the on state, and the data signals BDAT<0> to BDAT<7> are applied to the pixel wiring lines 11(0) to 11(7) as data signals SL0(n) to SL7(n), respectively.

Note that, in the present embodiment, grouping is performed such that one group is formed by eight of the pixel transistors 30, but the grouping may be performed such that one group is formed by K of the pixel transistors 30, K being an integer of 2 or more.

2.3 Effects

According to the present embodiment, only the sampling circuit 80 is provided in a region between the shift register 41 constituting the drive circuit 40 and the display region 10, and thus the size of the frame region can be reduced compared to the first embodiment.

3. Third Embodiment

A third embodiment will be described below. In the present embodiment also, as in the first to sixth examples described above, the plurality of pixel transistors 30 are provided in the region between the display region 10 and the drive circuit 40.

3.1 Configuration Regarding Driving of Pixel Wiring Lines

Figure 29:
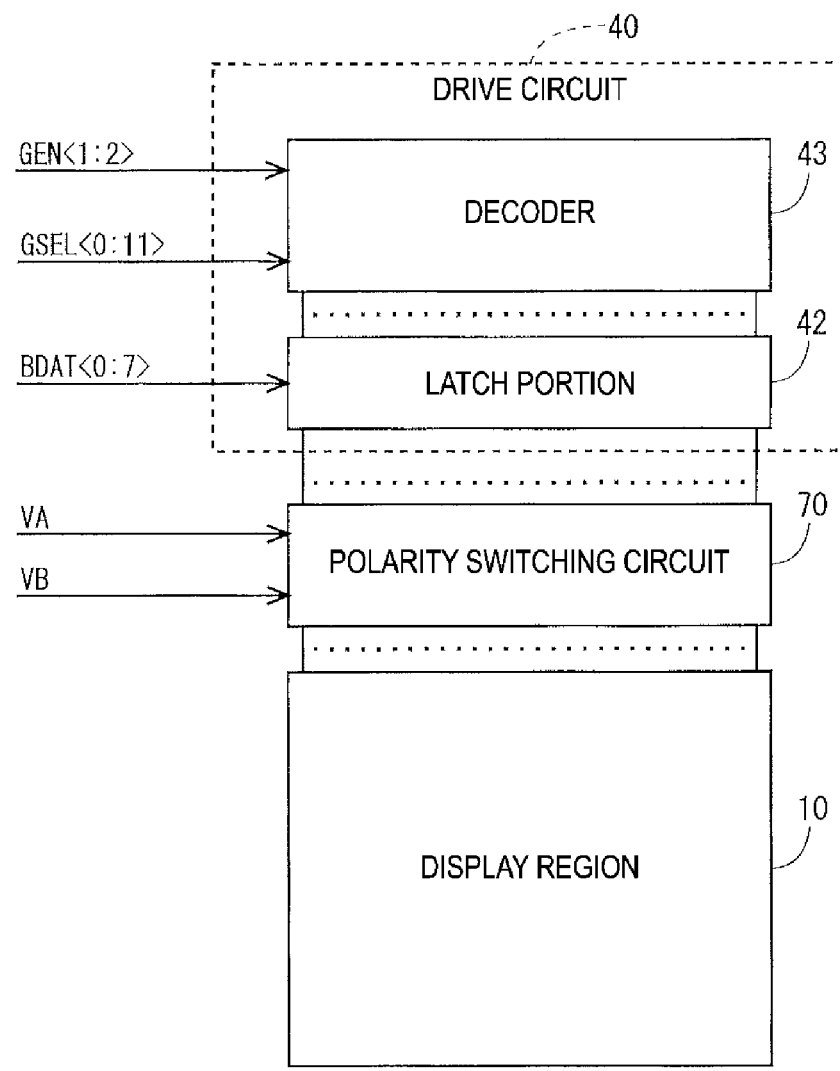
FIG. 29 is a functional block diagram for describing a configuration regarding driving of the pixel wiring lines in a third embodiment.

A configuration regarding the driving of the pixel wiring lines 11 will be described with reference to FIG. 29. As illustrated in FIG. 29, the drive circuit 40 and the polarity switching circuit 70 are provided in a region outside the display region 10, as constituent elements related to the driving of the pixel wiring lines 11. In the first embodiment, the drive circuit 40 includes the shift register 41 and the latch portion 42, but in the present embodiment, the drive circuit 40 includes a decoder (a decoding circuit) 43 and the latch portion 42. Note that the pixel transistors 30 are included in the polarity switching circuit 70.

A first address selection signal GEN<1:2> and a second address selection signal GSEL<0:11> are provided to the decoder 43 via the signal wiring line group 51. The first address selection signal GEN<1:2> is 2-bit data, and the second address selection signal GSEL<0:11> is 12-bit data. The decoder 43 receives the first address selection signal GEN<1:2> and the second address selection signal GSEL<0:11> as encoded data, and performs decoding of the data. Data obtained by the decoding (a decoding signal) is output from the decoder 43 as a timing signal that represents the capturing timing of the data signal BDAT<0:7> at each of the latch circuits 422 included in the latch portion 42. The configurations and operations of the latch portion 42 and the polarity switching circuit 70 are the same as those in the first embodiment.

In the configuration described above, the capturing of the data signal BDAT<0:7> is performed at the latch portion 42 on the basis of the timing signal output from the decoder 43. Then, the voltage corresponding to the data signal BDAT<0:7> captured by the latch portion 42 (the white display voltage VA or the black display voltage VB) is applied to each of the pixel electrodes 12 by the polarity switching circuit 70. As a result, a desired image is displayed in the display region 10.

3.2 Decoder (Decoding Circuit)

Figure 30:
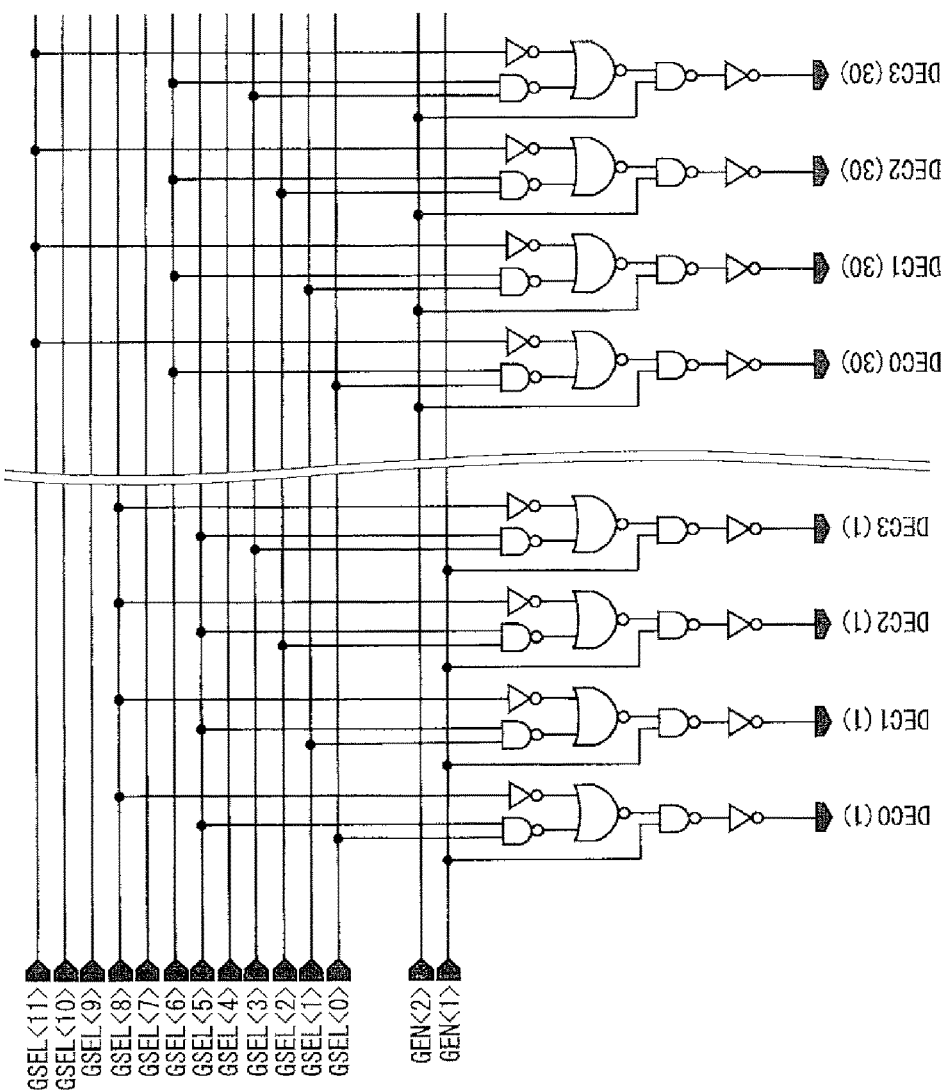
FIG. 30 is a circuit diagram illustrating a detailed configuration of a decoder in the third embodiment.
Figure 31:
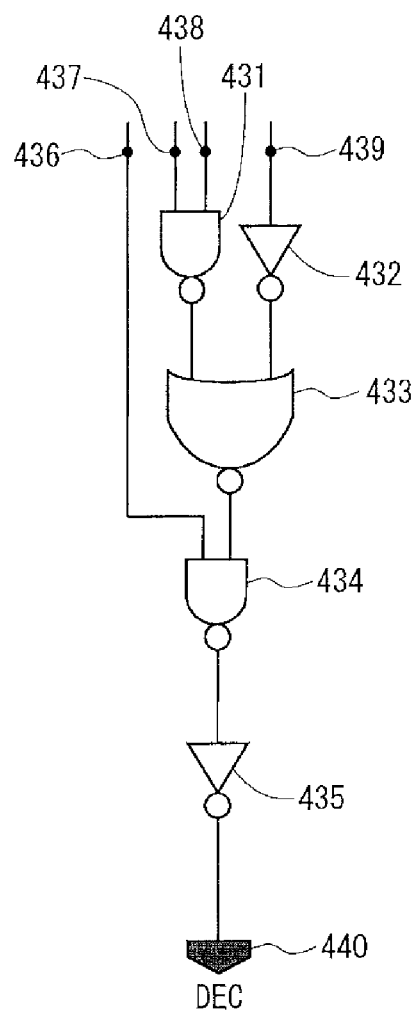
FIG. 31 is a circuit diagram illustrating a detailed configuration of a portion of the decoder corresponding to one output in the third embodiment.

FIG. 30 is a circuit diagram illustrating a detailed configuration of the decoder 43. FIG. 31 is a circuit diagram illustrating a detailed configuration of a portion of the decoder 43 corresponding to one output. As illustrated in FIG. 30, the first address selection signal GEN<1:2> and the second address selection signal GSEL<0:11> are provided to the decoder 43. As described in FIG. 31, the portion of the decoder 43 corresponding to one output includes a NAND circuit 431, an inverter 432, a NOR circuit 433, a NAND circuit 434, an inverter 435, and an output terminal (output unit) 440. With regard to FIG. 31, one of the first address selection signals GEN<1> and GEN<2> is provided to a node 436, one of the second address selection signals GSEL<0>> to GSEL<3> is provided to a node 437, one of the second address selection signals GSEL<4> to GSEL<7> is provided to a node 438, and one of the second address selection signals GSEL<8> to GSEL<11> is provided to a node 439. From the output terminal 440, the decoding signal is output as a timing signal DEC.

According to the configuration illustrated in FIG. 31, when the first address selection signal GEN provided to the node 436 is at the low level, the output from the NAND circuit 434 is set to the high level, and thus the timing signal DEC output from the output terminal 440 is set to the low level regardless of the second address selection signals GSEL provided to the nodes 437 to 439. When the first address selection signal GEN provided to the node 436 is at the high level, an operation is performed in accordance with the second address selection signals GSEL provided to the nodes 437 to 439 in the following manner. When all of the second address selection signals GSEL provided to the nodes 437 to 439 are at the high level, the output from the NAND circuit 431 and the output from the inverter 432 are set to the low level, and thus the output from the NOR circuit 433 is set to the high level. As a result, the output from the NAND circuit 434 is set to the low level, and thus the timing signal DEC output from the output terminal 440 is set to the high level. When at least one of the second address selection signals GSEL provided to the nodes 437 to 439 is at the low level, at least one of the output from the NAND circuit 431 and the output from the inverter 432 is set to the high level, and thus the output from the NOR circuit 433 is set to the low level. As a result, the output from the NAND circuit 434 is set to the high level, and thus the timing signal DEC output from the output terminal 440 is set to the low level.

Incidentally, in the present embodiment, 960 of the pixel electrodes 12 (32 rows×30 columns of the pixel electrodes 12) are provided in the display region 10, and in order for the latch portion 42 to capture 8 bits of data at a time, 120 of the timing signals DEC are transmitted from the decoder 43 to the latch portion 42. Those 120 timing signals DEC needs to be sequentially set to the high level for the predetermined time period each time, at mutually different timings. Thus, in the present embodiment, an address map is used for setting 120 addresses. This will be described below.

Figure 32:
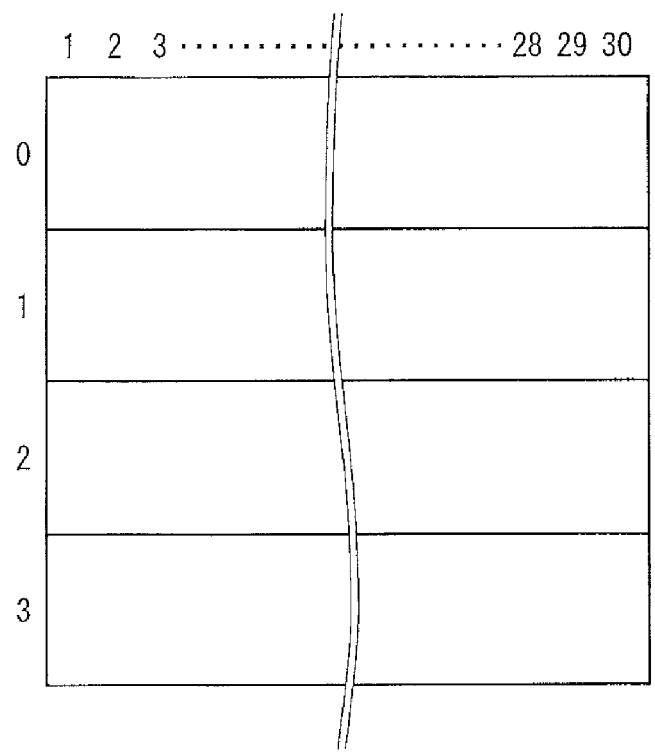
FIG. 32 is a diagram for describing how blocks are divided for address setting in the third embodiment.

As schematically illustrated in FIG. 32, address setting is performed 8 rows at a time for the 32 rows in the vertical direction. Therefore, eight of the pixel electrodes 12 consecutively provided in the vertical direction correspond to one address. Further, the portion of the decoder 43 for one output corresponds to one address, and the connection relationship in the decoder 43 is determined based on the setting in this address map.

FIGS. 33 to 36 are diagrams each illustrating an example of the address map. Values of X-address are recorded in a portion indicated by an arrow denoted by a reference sign 494. Note that values from 0 to 31 are set as the values of the X-address, but values from 1 to 30 are actually used. A value of the first address selection signal GEN<1> and a value of the first address selection signal GEN<2> are recorded in a portion indicated by an arrow denoted by a reference sign 491. As can be seen from FIGS. 33 to 36, when the value of the first address selection signal GEN<1> is H (high) and the value of the first address selection signal GEN<2> is L (low), addresses having the values from 1 to 15 for the X-address are selected, and when the value of the first address selection signal GEN<1> is L (low) and the value of the first address selection signal GEN<2> is H (high), addresses having the values from 16 to 30 for the X-address are selected. Information regarding to which of the second address selection signals GSEL<8> to GSEL<11> each of the addresses corresponds is recorded in a portion indicated by an arrow denoted by a reference sign 492, and information regarding to which of the second address selection signals GSEL<4> to GSEL<7> each of the addresses corresponds is recorded in a portion indicated by an arrow denoted by a reference sign 493. Further, information regarding to which of the second address selection signals GSEL<0> to GSEL<3> each of the addresses corresponds is recorded in a portion indicated by an arrow denoted by a reference sign 495.

Figure 33:
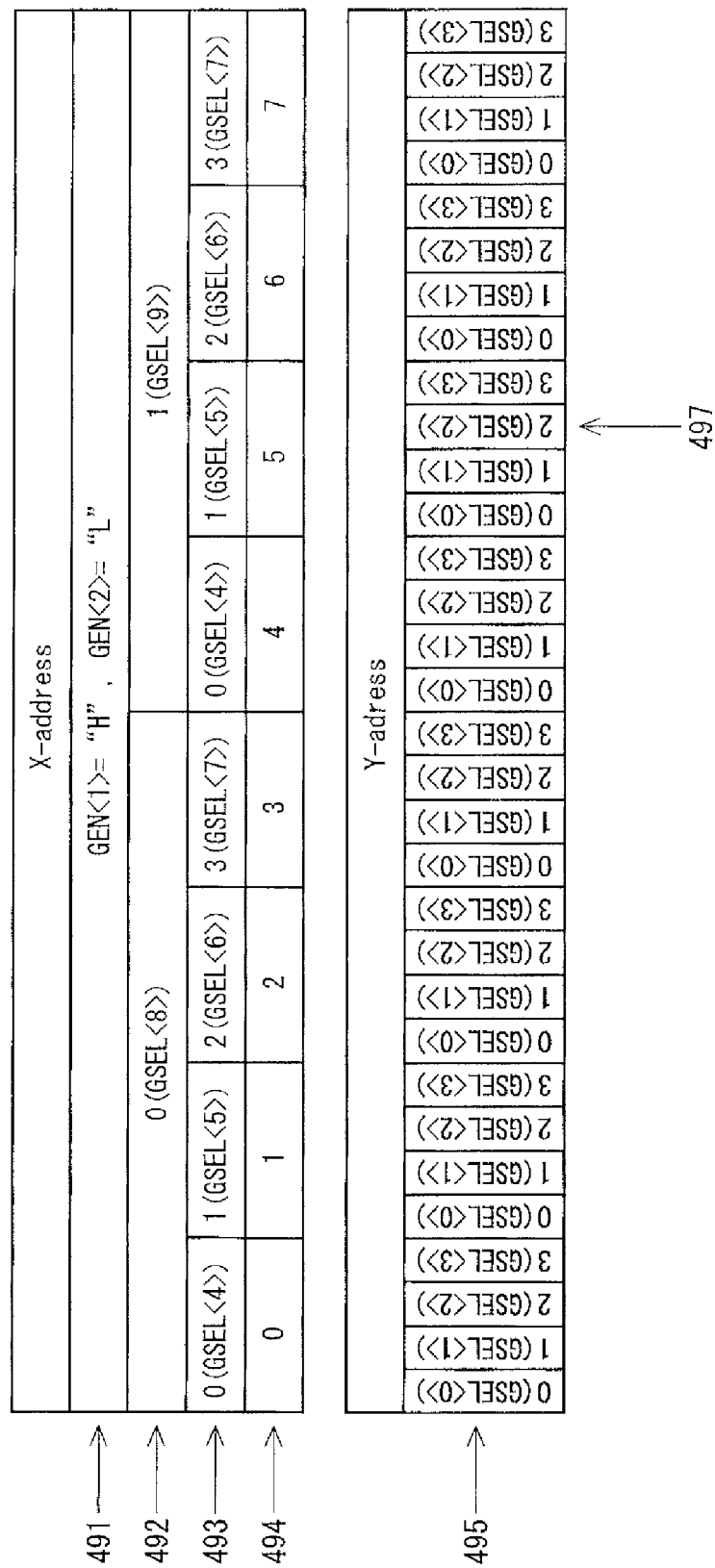
FIG. 33 is a diagram illustrating an example of an address map in the third embodiment.
Figure 34:
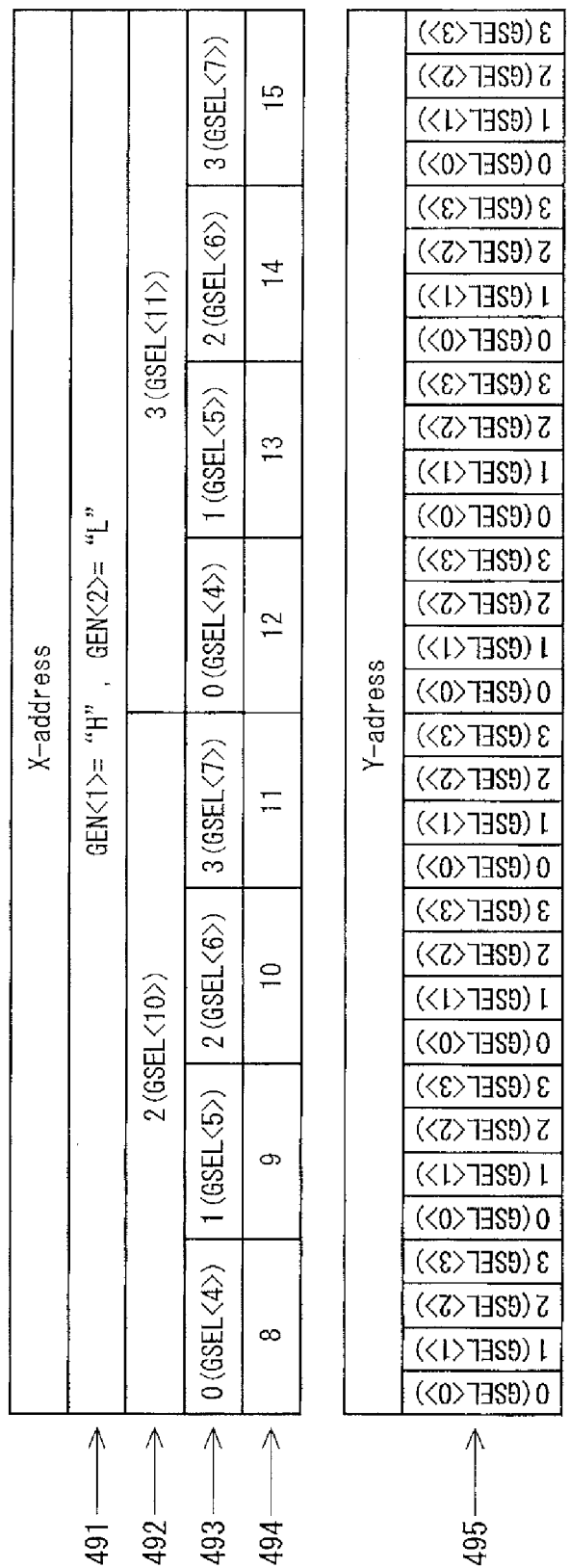
FIG. 34 is a diagram illustrating an example of the address map in the third embodiment.
Figure 35:
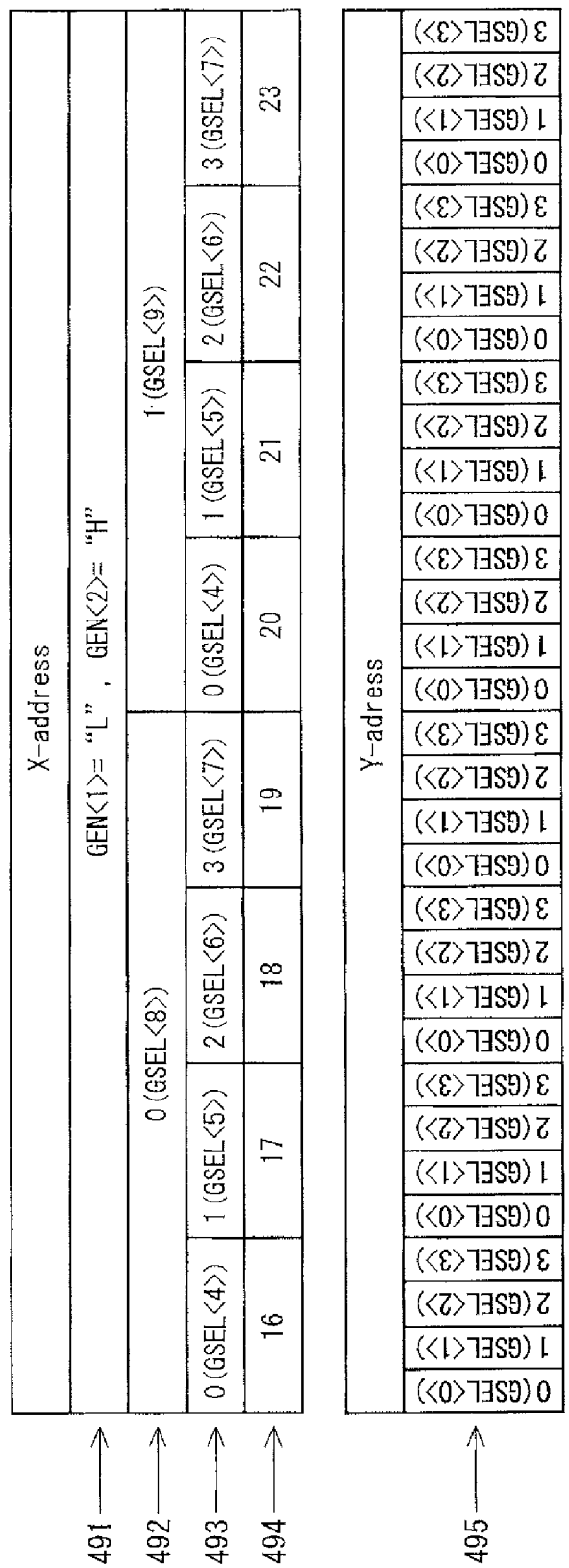
FIG. 35 is a diagram illustrating an example of the address map in the third embodiment.
Figure 36:
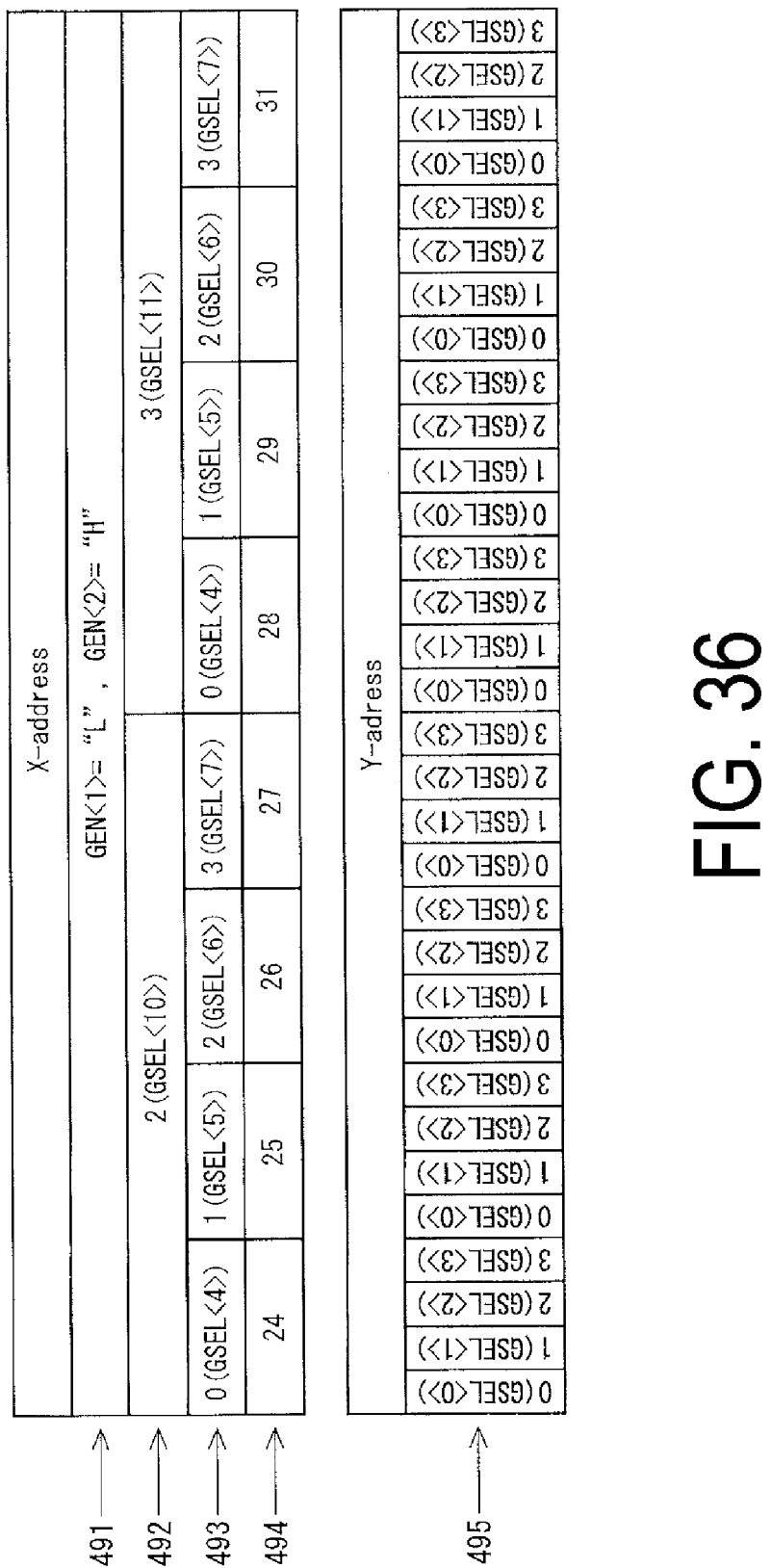
FIG. 36 is a diagram illustrating an example of the address map in the third embodiment.

For example, special attention is paid to an address portion indicated by an arrow denoted by a reference sign 497 in FIG. 33. The first address selection signal GEN and the second address selection signal GSEL are provided to the decoder 43 corresponding to this address portion (the portion of the decoder 43 corresponding to one output (see FIG. 31)) in the following manner. The first address selection signal GEN<1> is provided to the node 436. The second address selection signal GSEL<2> is provided to the node 437. The second address selection signal GSEL<5> is provided to the node 438. The second address selection signal GSEL<9> is provided to the node 439.

By changing the values of the first address selection signal GEN<1:2> and the second address selection signal GSEL<0:11>, which are provided to the input pad group 20, while taking into account the address map described above, the 120 decoding signals, which are sequentially set to the high level (active) for the predetermined time period each time, are output as the 120 timing signals DEC from the 120 output terminals 440 included in the decoder 43.

3.3 Configuration of Latch Portion

Figure 37:
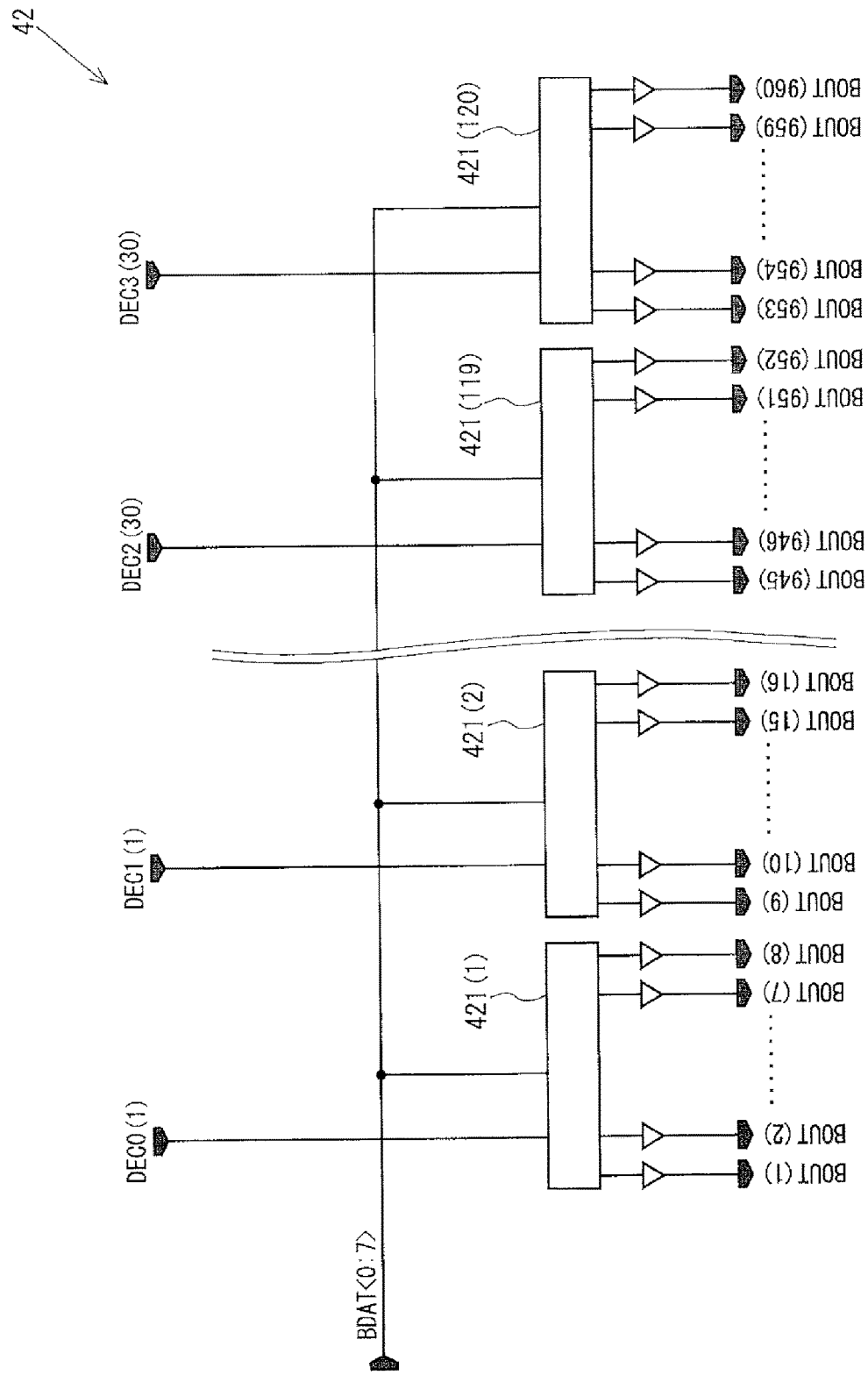
FIG. 37 is a block diagram illustrating a configuration of the latch portion in the third embodiment.

FIG. 37 is a block diagram illustrating a configuration of the latch portion 42. As described above, the latch portion 42 in the present embodiment has the same configuration as the latch portion 42 in the first embodiment. However, in the first embodiment, the timing signal SR output from the shift register 41 is provided to the latch portion 42, whereas in the present embodiment, the timing signal DEC output from the decoder 43 is provided to the latch portion 42.

As illustrated in FIG. 37, the latch portion 42 is constituted by 120 of the latch circuit groups 421(1) to 421(120). Each of the latch circuit groups 421 includes eight of the latch circuits 422. Therefore, 960 of the latch circuits 422 are provided in total. The data signal BDAT<0:7>, and the timing signal DEC output from the decoder 43 are provided to each of the latch circuit groups 421. When the timing signal DEC changes from the low level to the high level, each of the latch circuit groups 421 captures the data signal BDAT<0:7>, and outputs the data signal captured. As the 120 timing signals DEC are sequentially set to the high level for the predetermined time period each time, the capturing of the data signal BDAT<0:7> is sequentially performed at each of the 120 latch circuit groups 421.

Note that the configuration and operation of the latch circuit 422 included in the latch circuit group 421 are the same as those of the first embodiment (see FIGS. 19 and 20).

3.4 Effects

According to the present embodiment, as in the first embodiment, a liquid crystal display device is realized that is capable of obtaining a sufficient aperture ratio while suppressing the deterioration of the liquid crystal and the increase in the size of the frame region.

4. Fourth Embodiment

A fourth embodiment will be described below. In the present embodiment also, as in the first to sixth examples described above, the plurality of pixel transistors 30 are provided in the region between the display region 10 and the drive circuit 40.

4.1 Configuration Regarding Driving of Pixel Wiring Lines

Figure 38:
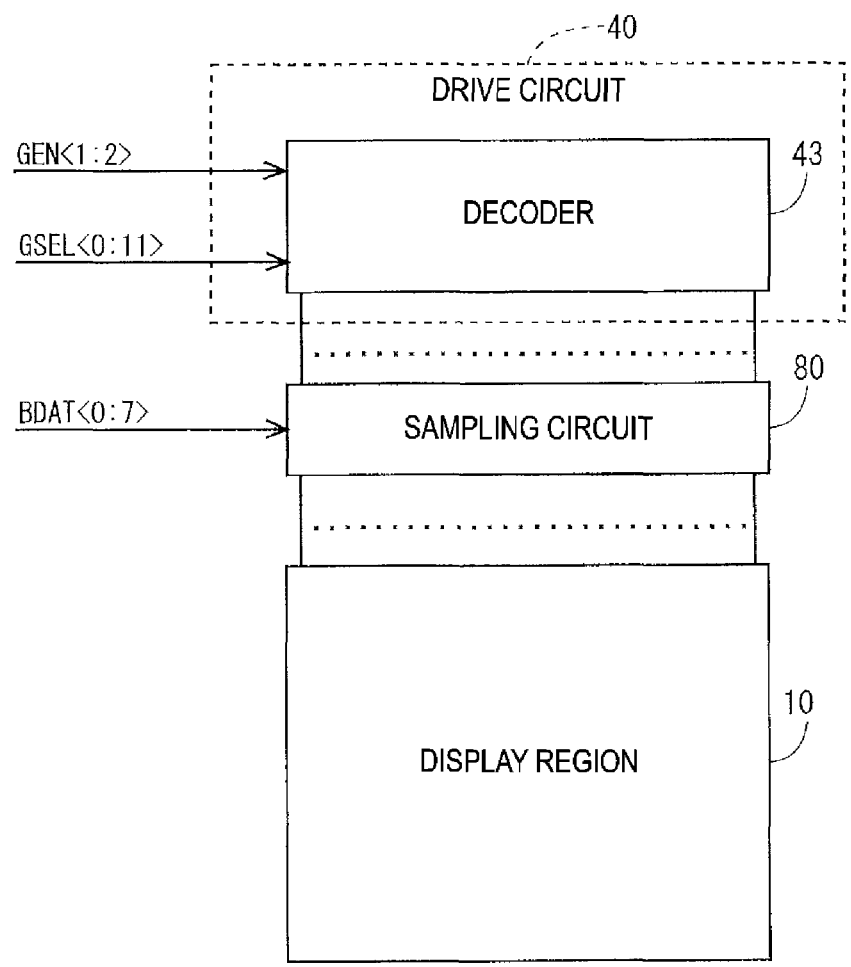
FIG. 38 is a functional block diagram for describing a configuration regarding driving of the pixel wiring lines in a fourth embodiment.

A configuration regarding the driving of the pixel wiring lines 11 will be described with reference to FIG. 38. As illustrated in FIG. 38, the drive circuit 40 and the sampling circuit 80 are provided in a region outside the display region 10, as constituent elements related to the driving of the pixel wiring lines 11. The drive circuit 40 includes the decoder 43. As can be seen from FIGS. 26 and 38, a configuration obtained by replacing the shift register 41 in the second embodiment with the decoder 43 is the configuration in the present embodiment. Note that the pixel transistors 30 are included in the sampling circuit 80.

The configuration and operation of the decoder 43 are the same as those of the third embodiment, and the configuration and operation of the sampling circuit 80 are the same as those of the second embodiment. Therefore, in the sampling circuit 80, the sampling of the data signal BDAT<0:7> is performed based on the timing signal DEC output from the decoder 43. Then, each of the data signals sampled by the sampling circuit 80 is applied to the corresponding pixel wiring line 11. As a result, the data signal is applied to each of the pixel electrodes 12, and a desired image is displayed on the display region 10.

4.2 Effects

According to the present embodiment, only the sampling circuit 80 is provided in the region between the decoder 43 constituting the drive circuit 40 and the display region 10, and thus the size of the frame region can be reduced compared to the third embodiment.

5. Fifth Embodiment

A fifth embodiment will be described. In the present embodiment, unlike the first to fourth embodiments, the drive circuit 40 that drives the pixel transistors 30 is not formed on the TFT substrate 5. In the present embodiment, as in the seventh example described above, the sampling circuit 60 including the plurality of pixel transistors 30 is formed on the TFT substrate 5 as a constituent element related to the driving of the pixel wiring lines 11 (see FIG. 9).

5.1 Configuration of Sampling Circuit

Figure 39:
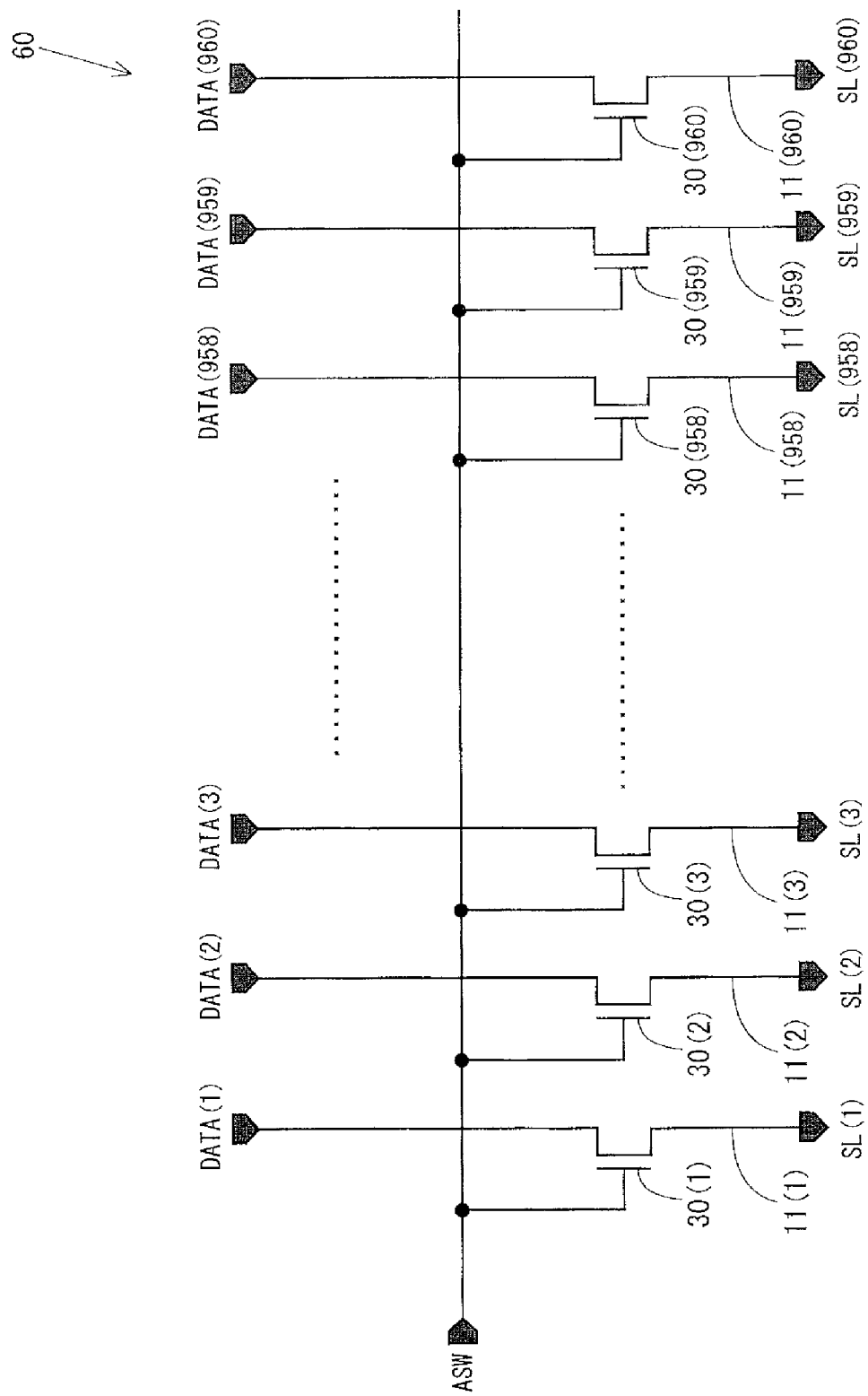
FIG. 39 is a circuit diagram illustrating a configuration of the sampling circuit in a fifth embodiment.

FIG. 39 is a circuit diagram illustrating a configuration of the sampling circuit 60 in the present embodiment. A switch control signal ASW and data signals DATA(1) to DATA(960) are provided to the sampling circuit 60 via the signal wiring line group 51. As illustrated in FIG. 39, the sampling circuit 60 includes 960 of the pixel transistors 30(1) to 30(960). The switch control signal ASW is provided to a control terminal of each of the pixel transistors 30, the corresponding data signal DATA is provided to a first conduction terminal thereof, and a second conduction terminal thereof is connected to the pixel wiring line 11. As can be seen from FIG. 39, one same switch control signal ASW is provided to the control terminal of each of the 960 pixel transistors 30(1) to 30(960), and mutually different data signals DATA(1) to DATA(960) are provided to the first conduction terminals of the 960 pixel transistors 30(1) to 30(960).

Figure 40:
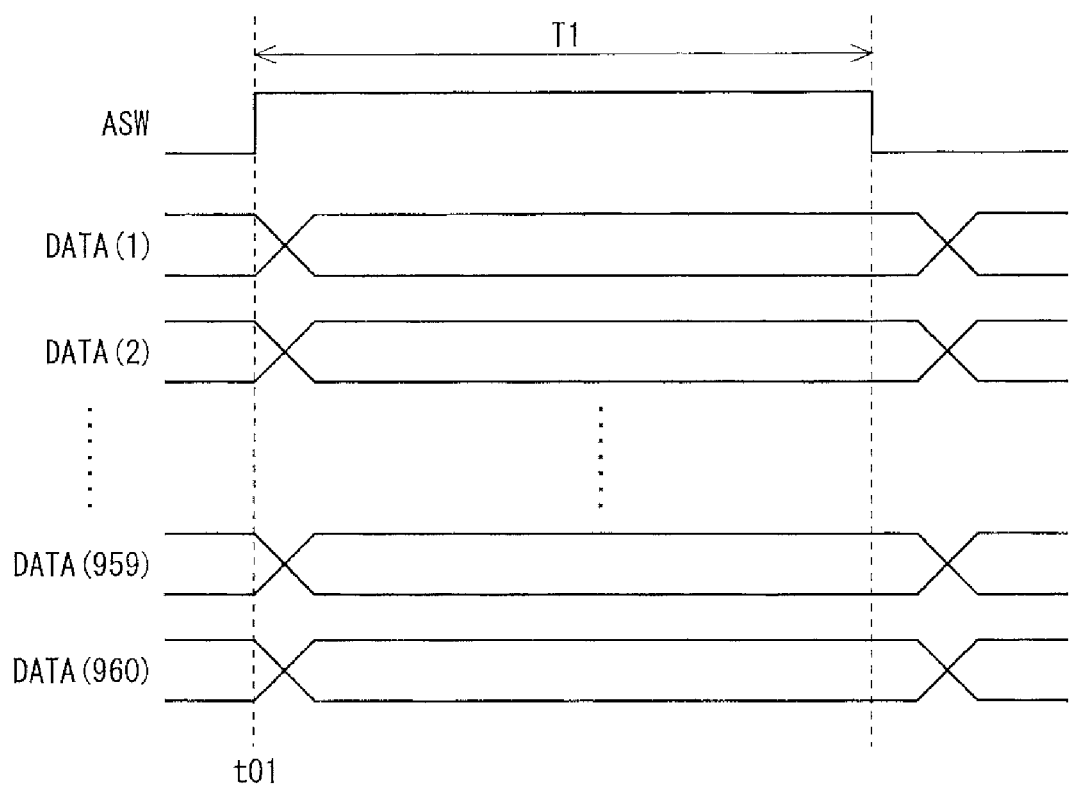
FIG. 40 is a signal waveform diagram for describing an operation of the sampling circuit in the fifth embodiment.

In the configuration described above, when the switch control signal ASW changes from the low level to the high level at a time t01 as illustrated in FIG. 40, the 960 pixel transistors 30(1) to 30(960) change from the off state to the on state. Then, sampling of the data signals DATA(1) to DATA(960) is performed during a time period denoted by a reference sign T1 in FIG. 40, and the sampled data signals DATA(1) to DATA(960) are applied to the pixel wiring lines

11(1) to 11(960) as the data signals SL(1) to SL(960), respectively. In the present embodiment, in this manner, the data signals SL are simultaneously provided to all of the pixel electrodes 12 in the display region 10.

5.2 Effects

According to the present embodiment, only the sampling circuit 60 is formed on the TFT substrate 5 as the constituent element related to the driving of the pixel wiring lines 11. Therefore, the size of the frame region can be significantly reduced compared to the first to fourth embodiments.

6. Sixth Embodiment

A sixth embodiment will be described. In the present embodiment, as in the fifth embodiment, the drive circuit 40 that drives the pixel transistors 30 is not formed on the TFT substrate 5. In other words, as in the seventh example described above, the sampling circuit 60 including the plurality of pixel transistors 30 is formed on the TFT substrate 5 as a constituent element related to the driving of the pixel wiring lines 11 (see FIG. 9).

6.1 Configuration of Sampling Circuit

Figure 41:
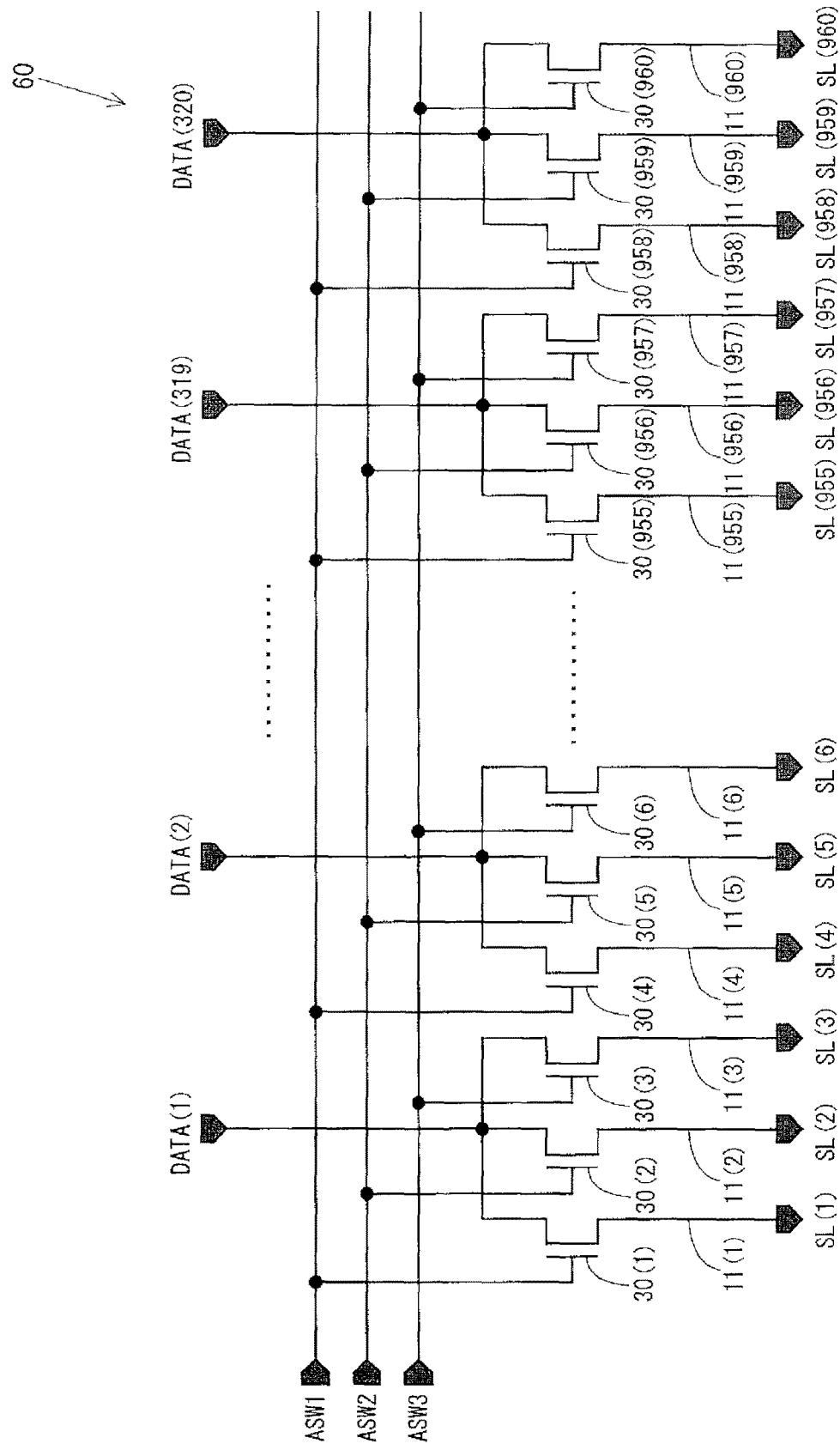
FIG. 41 is a circuit diagram illustrating a configuration of the sampling circuit in a sixth embodiment.

FIG. 41 is a circuit diagram illustrating a configuration of the sampling circuit 60 in the present embodiment. Switch control signals ASW1 to ASW3 and data signals DATA(1) to DATA(320) are provided to the sampling circuit 60 via the signal wiring line group 51. As illustrated in FIG. 41, the sampling circuit 60 includes 960 of the pixel transistors 30(1) to 30(960). As can be seen from FIG. 41, in the present embodiment, the 960 pixel transistors 30(1) to 30(960) are grouped such that one group is formed by three of the pixel transistors 30. When m is an integer from 1 to 320, the switch control signal ASW1 is provided to a control terminal of the pixel transistor 30(3 m−2), the switch control signal ASW2 is provided to a control terminal of the pixel transistor 30(3 m−1), and the switch control signal ASW3 is provided to a control terminal of the pixel transistor 30(3 m). In this way, mutually different switch control signals are provided to the control terminals of the three pixel transistors 30 forming the same group. Further, the corresponding data signal DATA is provided to the first conduction terminal of each of the pixel transistors 30, and the second conduction terminal thereof is connected to the pixel wiring line 11. However, one data signal DATA is provided to the first conduction terminals of the three pixel transistors 30 forming the same group, in a time division manner. Note that, in the present embodiment, grouping is performed such that one group is formed by the three pixel transistors 30, but the grouping may be performed such that one group is formed by Z of the pixel transistors 30, Z being an integer of 2 or more.

Figure 42:
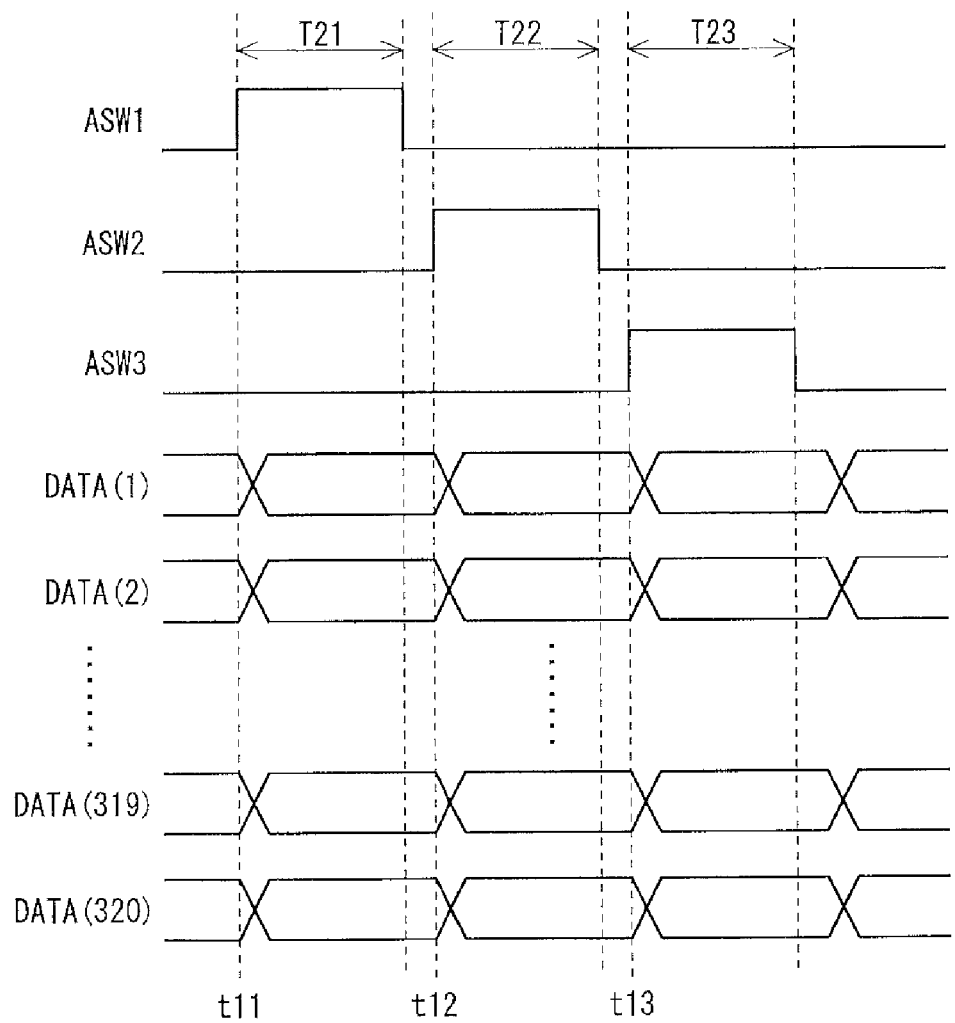
FIG. 42 is a signal waveform diagram for describing an operation of the sampling circuit in the sixth embodiment.

In the configuration described above, as illustrated in FIG. 42, the three switch control signals ASW1 to AWS3 are sequentially set to the high level for a predetermined time period each time. First, when the switch control signal ASW1 changes from the low level to the high level at a time t11, 320 of the pixel transistors 30(3 m−2) change from the off state to the on state. Then, sampling of the data signals DATA(1) to DATA(320) is performed during a time period denoted by a reference sign T21 in FIG. 42, and the sampled data signals DATA(1) to DATA(320) are applied to the pixel wiring lines 11(1), 11(4), . . . , 11(955), and 11(958) as the data signals SL(1), SL(4), . . . , SL(955), and SL(958), respectively. Subsequently, when the switch control signal ASW2 changes from the low level to the high level at a time t12, 320 of the pixel transistors 30(3 m−1) change from the off state to the on state. Then, sampling of the data signals DATA(1) to DATA(320) is performed during a time period denoted by a reference sign T22 in FIG. 42, and the sampled data signals DATA(1) to DATA(320) are applied to the pixel wiring lines 11(2), 11(5), 11(956), and 11(959) as the data signals SL(2), SL(5), SL(956), and SL(959), respectively. Finally, when the switch control signal ASW3 changes from the low level to the high level at a time t13, 320 of the pixel transistors 30(3 m) change from the off state to the on state. Then, sampling of the data signals DATA(1) to DATA(320) is performed during a time period denoted by a reference sign T23 in FIG. 42, and the sampled data signals DATA(1) to DATA(320) are applied to the pixel wiring lines 11(3), 11(6), . . . , 11(957), and 11(960) as the data signals SL(3), SL(6), . . . , SL(957), and SL(960), respectively.

6.2 Effects

According to the present embodiment, as in the fifth embodiment, only the sampling circuit 60 is formed on the TFT substrate 5 as the constituent element related to the driving of the pixel wiring lines 11, and thus the size of the frame region can be significantly reduced compared to the first to fourth embodiments. Further, since the sampling of the data signal DATA applied to the pixel wiring line 11 is performed in the time division manner, the number of signal wiring lines required for transmitting the data signal DATA is reduced compared to the fifth embodiment. Therefore, the size of the frame region for the signal wiring lines can be reduced.

7. Other

Although the present disclosure has been described in detail above, the above description is exemplary in all respects and is not limited thereto. It is understood that numerous other modifications or variations can be made without departing from the scope of the present disclosure. For example, the liquid crystal display device included in the dual-layer display has been described as an example above, but the disclosure can also be applied to other liquid crystal display devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device including a panel substrate provided with a display region including a plurality of pixel electrodes, the liquid crystal display device comprising:
    a plurality of pixel transistors that is provided in a region outside the display region and corresponds to the plurality of pixel electrodes in a one-to-one manner;
    a plurality of pixel wiring lines configured to respectively connect the plurality of pixel electrodes to the plurality of pixel transistors;
    an input pad group provided on the panel substrate and to which a drive signal group for driving the plurality of pixel transistors is input; and
    a drive circuit configured to drive the plurality of pixel transistors based on the drive signal group,
    wherein, in a region on the panel substrate, the plurality of pixel transistors is provided only in a first region other than a region between the input pad group and the display region,
    in the region on the panel substrate, the drive circuit is provided in a second region other than the region between the input pad group and the display region such that the plurality of pixel transistors is disposed in a region between the drive circuit and the display region, the drive circuit includes a decoding circuit including a plurality of output units, the plurality of output units outputs, as a plurality of timing signals, a plurality of decoding signals that becomes active sequentially, and capturing of a plurality of data signals included in the drive signal group is performed based on the plurality of timing signals.

2. The liquid crystal display device according to claim 1, wherein the panel substrate has a rectangular shape formed by a first side, a second side facing the first side, a third side connecting one end of the first side and one end of the second side, and a fourth side connecting another end of the first side and another end of the second side, the input pad group is provided in a frame region along the first side on the panel substrate, and the plurality of pixel transistors is not provided in the frame region along the first side and is provided in one of a frame region along the second side, a frame region along the third side, and a frame region along the fourth side.

3. The liquid crystal display device according to claim 2, wherein the plurality of pixel transistors is disposed having a direction extending from the plurality of pixel transistors to the plurality of pixel electrodes being the same for all of the plurality of pixel wiring lines.

4. The liquid crystal display device according to claim 3, wherein the plurality of pixel transistors is provided only in the frame region along the second side.

5. The liquid crystal display device according to claim 3, wherein the plurality of pixel transistors is provided only in one of the frame region along the third side and the frame region along the fourth side.

6. The liquid crystal display device according to claim 2, wherein the plurality of pixel transistors is provided in the frame region along the third side and the frame region along the fourth side, and the plurality of pixel wiring lines includes a plurality of first-type pixel wiring lines configured to connect first pixel transistors provided in the frame region along the third side to first corresponding pixel electrodes of the plurality of pixel electrodes, and a plurality of second-type pixel wiring lines configured to connect second pixel transistors provided in the frame region along the fourth side to second corresponding pixel electrodes of the plurality of pixel electrodes.

7. The liquid crystal display device according to claim 1, wherein the panel substrate has a circular shape, and the plurality of pixel transistors is provided only in a frame region on a side on which the display region is present with respect to a second virtual line as a reference, a first virtual line being a shortest virtual line connecting the display region and the input pad group, and the second virtual line being a virtual line orthogonal to the first virtual line and passing through a connection point between the first virtual line and the display region.

8. The liquid crystal display device according to claim 7, wherein the plurality of pixel transistors is disposed having a direction extending from the plurality of pixel transistors to the plurality of pixel electrodes being the same for all of the plurality of pixel wiring lines.

9. The liquid crystal display device according to claim 8, wherein the plurality of pixel transistors is provided only in a frame region on a side on which the input pad group is not present with respect to a third virtual line as a reference, the third virtual line being a virtual line passing through a center of the display region and being parallel to the second virtual line.

10. The liquid crystal display device according to claim 8, wherein the plurality of pixel transistors is provided only in a frame region on one side with respect to a fourth virtual line as a reference, the fourth virtual line being a virtual line passing through the connection point between the first virtual line and the display region and through a center of the display region.

11. The liquid crystal display device according to claim 7, wherein the plurality of pixel transistors is provided in both the frame region on one side and the frame region on another side with respect to a fourth virtual line as a reference, the fourth virtual line being a virtual line passing through the connection point between the first virtual line and the display region and through a center of the display region, and the plurality of pixel wiring lines includes a plurality of first-type pixel wiring lines configured to connect first pixel transistors provided in the frame region on the one side, with respect to the fourth virtual line, to first corresponding pixel electrodes of the plurality of pixel electrodes, and a plurality of second-type pixel wiring lines configured to connect second pixel transistors provided in the frame region on the other side, with respect to the fourth virtual line, to second corresponding pixel electrodes of the plurality of pixel electrodes.

12. The liquid crystal display device according to claim 6, wherein a number of the plurality of first-type pixel wiring lines and a number of the plurality of second-type pixel wiring lines are the same.

13. A liquid crystal display device including a panel substrate provided with a display region including a plurality of pixel electrodes, the liquid crystal display device comprising:

a plurality of pixel transistors that is provided in a region outside the display region and corresponds to the plurality of pixel electrodes in a one-to-one manner;

a plurality of pixel wiring lines configured to respectively connect the plurality of pixel electrodes to the plurality of pixel transistors;

an input pad group provided on the panel substrate and to which a drive signal group for driving the plurality of pixel transistors is input; and a drive circuit configured to drive the plurality of pixel transistors based on the drive signal group, wherein, in a region on the panel substrate, the plurality of pixel transistors is provided only in a first region other than a region between the input pad group and the display region, in the region on the panel substrate, the drive circuit is provided in a second region other than the region between the input pad group and the display region such that the plurality of pixel transistors is disposed in a region between the drive circuit and the display region, the drive circuit includes a shift register constituted by a plurality of unit circuits connected in series, the plurality of unit circuits outputs, as a plurality of timing signals, a plurality of output signals that becomes active sequentially, capturing of a plurality of data signals included in the drive signal group is performed based on the plurality of timing signals, the drive circuit further includes M latch circuits for one timing signal, M being an integer of 2 or more, and the M latch circuits capture M data signals of the plurality of data signals based on corresponding timing signals, and output the captured M data signals.

14. The liquid crystal display device according to claim 13, further comprising:

a polarity switching circuit that includes the plurality of pixel transistors and is configured to switch a polarity of a voltage applied to the plurality of pixel electrodes at a predetermined interval, wherein the polarity switching circuit is constituted by a plurality of polarity controllers respectively corresponding to the plurality of pixel wiring lines, each of the plurality of polarity controllers includes a first pixel transistor and a second pixel transistor for which an on/off state changes in a mutually inverted manner based on a data signal output from a corresponding latch circuit, a first voltage and a second voltage, of which a voltage level changes in a mutually inverted manner between a first level and a second level at the predetermined interval, are applied to each of the plurality of polarity controllers, when the first pixel transistor is in the on state, the first voltage is applied to a corresponding pixel electrode via a corresponding pixel wiring line, and when the second pixel transistor is in the on state, the second voltage is applied to the corresponding pixel electrode via the corresponding pixel wiring line.

15. A liquid crystal display device including a panel substrate provided with a display region including a plurality of pixel electrodes, the liquid crystal display device comprising:

a plurality of pixel transistors that is provided in a region outside the display region and corresponds to the plurality of pixel electrodes in a one-to-one manner;

a plurality of pixel wiring lines configured to respectively connect the plurality of pixel electrodes to the plurality of pixel transistors;

an input pad group provided on the panel substrate and to which a drive signal group for driving the plurality of pixel transistors is input;

a drive circuit configured to drive the plurality of pixel transistors based on the drive signal group; and a sampling circuit including the plurality of pixel transistors, wherein, in a region on the panel substrate, the plurality of pixel transistors is provided only in a first region other than a region between the input pad group and the display region, in the region on the panel substrate, the drive circuit is provided in a second region other than the region between the input pad group and the display region such that the plurality of pixel transistors is disposed in a region between the drive circuit and the display region, the drive circuit includes a shift register constituted by a plurality of unit circuits connected in series, the plurality of unit circuits outputs, as a plurality of timing signals, a plurality of output signals that becomes active sequentially, capturing of a plurality of data signals included in the drive signal group is performed based on the plurality of timing signals, the plurality of pixel transistors is grouped with one group being formed by K pixel transistors of the plurality of pixel transistors, K being an integer of 2 or more, each of the plurality of pixel transistors includes a control terminal to which a corresponding timing signal is provided, a first conduction terminal to which a corresponding data signal is provided, and a second conduction terminal connected to a corresponding pixel wiring line, the same timing signal is provided to the control terminals of the K pixel transistors forming the same group, and mutually different data signals are provided to the first conduction terminals of the K pixel transistors forming the same group.

* * * * *